(12) United States Patent
Kravets et al.

(10) Patent No.: US 9,860,763 B2
(45) Date of Patent: Jan. 2, 2018

(54) ANALYZING WIRELESS NETWORK PERFORMANCE

(71) Applicant: Cognitive Systems Corp., Waterloo (CA)

(72) Inventors: Oleksiy Kravets, Petersburg (CA); Tajinder Manku, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 14/668,549

(22) Filed: Mar. 25, 2015

(65) Prior Publication Data

US 2016/0286409 A1    Sep. 29, 2016

(51) Int. Cl.
*H04W 24/02* (2009.01)
*H04L 29/08* (2006.01)
(Continued)

(52) U.S. Cl.
CPC ............. *H04W 24/02* (2013.01); *H04L 67/12* (2013.01); *H04L 67/18* (2013.01); *H04L 67/22* (2013.01);
(Continued)

(58) Field of Classification Search
CPC .................................................... H04W 24/02
See application file for complete search history.

(56) References Cited

U.S. PATENT DOCUMENTS 6,046,682 A    4/2000  Zimmerman et al.
6,564,065 B1   5/2003  Chang et al.
(Continued)

FOREIGN PATENT DOCUMENTS

CA    2192248    6/1997
EP    0863638    9/1998
(Continued)

OTHER PUBLICATIONS

SeeGull® EXflex™ Scanning Receiver, PCTEL® RF Solutions, Obtained online at http://rfsolutions.pctel.com/artifacts/10MRK2_11_SeeGull_EXflex_Brochure.pdf on Jul. 17, 2014, 4 pages.
(Continued)

*Primary Examiner* — Derrick Ferris
*Assistant Examiner* — Kevin Lee
(74) *Attorney, Agent, or Firm* — Henry Patent Law Firm PLLC

(57) ABSTRACT

In some aspects, a wireless monitoring system includes a sensor network, a data analysis system and a communication interface. The sensor network includes wireless sensor devices configured to passively monitor radio frequency (RF) signals exchanged in a wireless communication network in a geographic region, and each wireless sensor device is configured to compute local network-usage parameters based on processing the RF signals detected by the wireless sensor device. The data analysis system is configured to analyze regional performance metrics of the wireless communication network based on the local network-usage parameters computed by the biosensor devices. In some instances, the communication interface is configured to transmit a network performance report to the wireless communication network based on the analysis of the regional performance metric.

26 Claims, 12 Drawing Sheets

(51) Int. Cl.
  *H04W 4/02* (2009.01)
  *H04W 24/10* (2009.01)
  *H04W 24/08* (2009.01)
(52) U.S. Cl.
  CPC ......... *H04L 67/2833* (2013.01); *H04W 4/021* (2013.01); *H04W 24/08* (2013.01); *H04W 24/10* (2013.01)

(56) References Cited

U.S. PATENT DOCUMENTS

| | | |
|---|---|---|
| 6,580,914 B1 | 6/2003 | Smith |
| 6,816,709 B2 | 11/2004 | Dickey |
| 6,917,609 B2 | 7/2005 | Dickey |
| 6,931,235 B2 | 8/2005 | Kline et al. |
| 6,950,665 B2 | 9/2005 | Swift et al. |
| 7,013,113 B2 | 3/2006 | Dickey |
| 7,019,691 B1 | 3/2006 | Soltanian et al. |
| 7,050,755 B2 | 5/2006 | Kline |
| 7,180,420 B2 | 2/2007 | Maurer |
| 7,236,746 B2 | 6/2007 | Peric |
| 7,272,126 B2 | 9/2007 | Soltanian et al. |
| 7,295,156 B2 | 11/2007 | Van Wyck Loomis |
| 7,460,837 B2 | 12/2008 | Diener |
| 7,466,986 B2 | 12/2008 | Halcrow et al. |
| 7,610,036 B2 | 10/2009 | Teo et al. |
| 7,639,985 B2 | 12/2009 | Dickey |
| 8,422,461 B2 | 4/2013 | Dickey |
| 8,576,825 B2 | 11/2013 | Wu et al. |
| 2002/0052208 A1 | 5/2002 | Porcino |
| 2003/0139909 A1 | 7/2003 | Ozawa |
| 2004/0152471 A1 | 8/2004 | MacDonald |
| 2005/0108129 A1 | 5/2005 | Seibert et al. |
| 2005/0286409 A1 | 12/2005 | Yoon et al. |
| 2006/0083205 A1 | 4/2006 | Buddhikot et al. |
| 2006/0246911 A1 | 11/2006 | Petermann |
| 2008/0076450 A1 | 3/2008 | Nanda et al. |
| 2008/0125108 A1 | 5/2008 | Kuo et al. |
| 2008/0166974 A1 | 7/2008 | Teo et al. |
| 2008/0231499 A1 | 9/2008 | Kim et al. |
| 2008/0266050 A1 | 10/2008 | Crouse et al. |
| 2009/0197550 A1 | 8/2009 | Huttunen et al. |
| 2009/0201208 A1 | 8/2009 | McPherson et al. |
| 2010/0124886 A1* | 5/2010 | Fordham .............. H04B 17/382 455/67.11 |
| 2010/0135263 A1 | 6/2010 | Zakrzewski |
| 2010/0203837 A1 | 8/2010 | Taniguichi |
| 2010/0246416 A1* | 9/2010 | Sinha et al. .................. 370/250 |
| 2011/0085524 A1 | 4/2011 | Soliman et al. |
| 2011/0166897 A1 | 7/2011 | Beckman |
| 2011/0185059 A1 | 7/2011 | Adnani et al. |
| 2011/0210843 A1 | 9/2011 | Kummetz |
| 2011/0274001 A1 | 11/2011 | Chin et al. |
| 2011/0285589 A1 | 11/2011 | Bull |
| 2012/0238218 A1 | 9/2012 | Stine |
| 2013/0029589 A1 | 1/2013 | Bontu et al. |
| 2013/0072226 A1 | 3/2013 | Thramann |
| 2013/0150074 A1 | 6/2013 | Shrestha et al. |
| 2013/0310093 A1 | 11/2013 | Giannakis et al. |
| 2014/0063055 A1 | 3/2014 | Osterhout et al. |
| 2014/0086081 A1 | 3/2014 | Mack et al. |
| 2014/0162702 A1 | 6/2014 | Crawford et al. |
| 2014/0168225 A1 | 6/2014 | Ohwaki et al. |
| 2014/0256328 A1 | 9/2014 | Li |
| 2014/0274109 A1 | 9/2014 | Venkatraman et al. |
| 2014/0362711 A1 | 12/2014 | Jiang et al. |
| 2015/0119014 A1 | 4/2015 | Muraoka et al. |

FOREIGN PATENT DOCUMENTS

| | | |
|---|---|---|
| WO | 03/009612 | 1/2003 |
| WO | 2006/135542 | 12/2006 |
| WO | 2010/083606 | 7/2010 |

OTHER PUBLICATIONS

EXflex™ Pay Per Use Metered Licensing System, Feature Highlight, Obtained online at http://rfsolutions.pctel.com/artifacts/Pctel_PPU_FINAL.PDF on Jul. 17, 2014, 1 page.

PCTEL, SeeGull® Scann Receivers, High Performance Wireless Network Measurement, Obtained online at http://rfsolutions.pctel.com/content.cgi?id_num=683 on Jul. 17, 2014, 8 pages.

Baldock radio monitoring station, obtained online at http://stakeholders.ofcom.org.uk/binaries/enforcement/spectrum-enforcement/baldock.pdf, on Jul. 17, 2014, 13 pages.

PCTEL, SeeHawk® Wireless Drive and Walk Test Suite, obtained online at http://rfsolutions.pctel.com/content.cgi?id_num=1013 on Aug. 20, 2014, 9 pages.

AZQ Android—WCDMA/GSM Drive Test Tool on Android, obtained online at http://www.azenqos.com/ on Aug. 6, 2014, 13 pages.

Buddhikot et al. DIMSUMNet: New Directions in Wireless Networking Using Coordinated Dynamic Spectrum Access, Poroceedings of the Sixth IEEE International Symposium on (WoWMoM '05), 2005 IEEE; 8 pages.

Office Action in U.S. Appl. No. 14/334,822 issued on Oct. 24, 2014, 17 pages.

Office action in U.S. Appl. No. 14/521,173 on Dec. 10, 2014, 15 pages.

International Search Report and Written Opinion of the International Searching Authority issued in International Application No. PCT/CA2014/000826 on Jul. 16, 2015; 8 pages.

Non-Final Office Action received in U.S. Appl. No. 14/730,688, Jul. 17, 2015, 20 pages.

International Search Report and Written Opinion issued in application PCT/CA2014/000602 on Mar. 20, 2015, 10 pages.

Office action in U.S. Appl. No. 14/613,912 issued on May 19, 2015, 18 pages.

United States Patent and Trademark Office; Notice of Allowance and Allowability issued in U.S. Appl. No. 14/730,688 on Nov. 20, 2015; 22 pages; Alexandria, VA; US.

Canadian Intellectual Property Office; International Search Report and Written Opinion of the International Searching Authority issued in International Application No. PCT/CA2015/000197 on Nov. 5, 2015; 11 pages; Gatineau, Quebec; CA.

Canadian Intellectual Property Office; International Search Report and Written Opinion of the International Searching Authority issued in International Application No. PCT/CA2015/000349 on Nov. 30, 2015; 9 pages; Gatineau, Quebec; CA.

United States Patent and Trademark Office; Final Office Action received in U.S. Appl. No. 14/613,912, Feb. 10, 2016, 17 pages; Alexandria, VA; US.

Bengtsson, M., et al., On the Estimation of Azimuth Distributions and Azimuth Spectra, Vehicular Technology Conference, 2001, VTC 2001, IEEE VTC 54th, Oct. 7, 2001, vol. 3, pp. 1612-1615; Atlantic City, NJ; US.

Tang, et al., Study on Power Azimuth Spectrum of Wireless Channel in Microcell Environments, 14th IEEE 2003 International Symposium on Personal, Indoor and Mobile Radio Proceedings, Sep. 7, 2003, vol. 1, pp. 685-687; Beijing, CN.

Canadian Intellectual Property Office; International Search Report and Written Opinion of the International Searching Authority issued in International Application No. PCT/CA2015/000446 on Feb. 24, 2016; 10 pages; Gatineau, Quebec; CA.

Non-Final Office Action received in U.S. Appl. No. 14/613,912, May 27, 2016, 23 pages.

Notice of Allowance and Allowability issued in U.S. Appl. No. 14/613,912 on Sep. 29, 2016; 11 pages.

\* cited by examiner

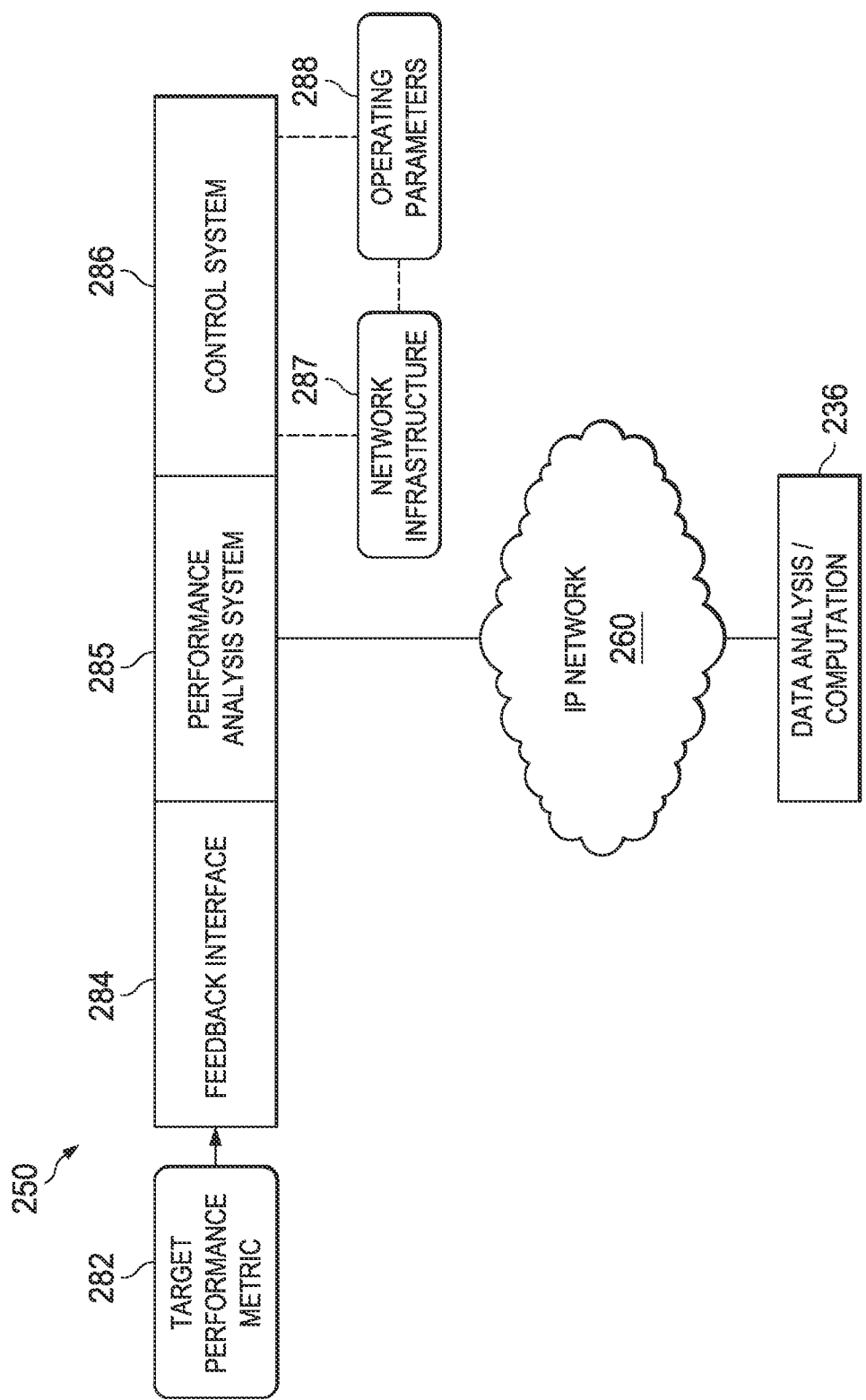

ANALYZING WIRELESS NETWORK PERFORMANCE

BACKGROUND

This specification relates to analyzing performance metrics of a wireless network, for example, a cellular network.

Cellular networks can provide wireless voice and data services, for example, to mobile devices and other types of user equipment. Cellular networks typically include a number of base stations that each provide wireless services for a particular cell. The base station includes radio antennas that wirelessly communicate with the user equipment in the cell.

SUMMARY

In a general aspect, performance feedback is provided to a wireless network.

In some aspects, a wireless monitoring system includes a sensor network, a data analysis system and a communication interface. The sensor network includes wireless sensor devices configured to passively monitor radio frequency (RF) signals exchanged in a wireless communication network in a geographic region, and each wireless sensor device is configured to compute local network-usage parameters based on processing the RF signals detected by the wireless sensor device. The data analysis system is configured to analyze regional performance metrics of the wireless communication network based on the local network-usage parameters computed by the biosensor devices. In some instances, the communication interface is configured to transmit a network performance report to the wireless communication network based on the analysis of the regional performance metric.

The details of one or more implementations are set forth in the accompanying drawings and the description below. Other features, objects, and advantages will be apparent from the description and drawings, and from the claims.

DESCRIPTION OF DRAWINGS

FIGS. 2A and 2B are block diagrams showing architecture of an example wireless-spectrum analysis system that provides feedback to a wireless network.

Like reference symbols in the various drawings indicate like elements.

DETAILED DESCRIPTION

Figure 1:
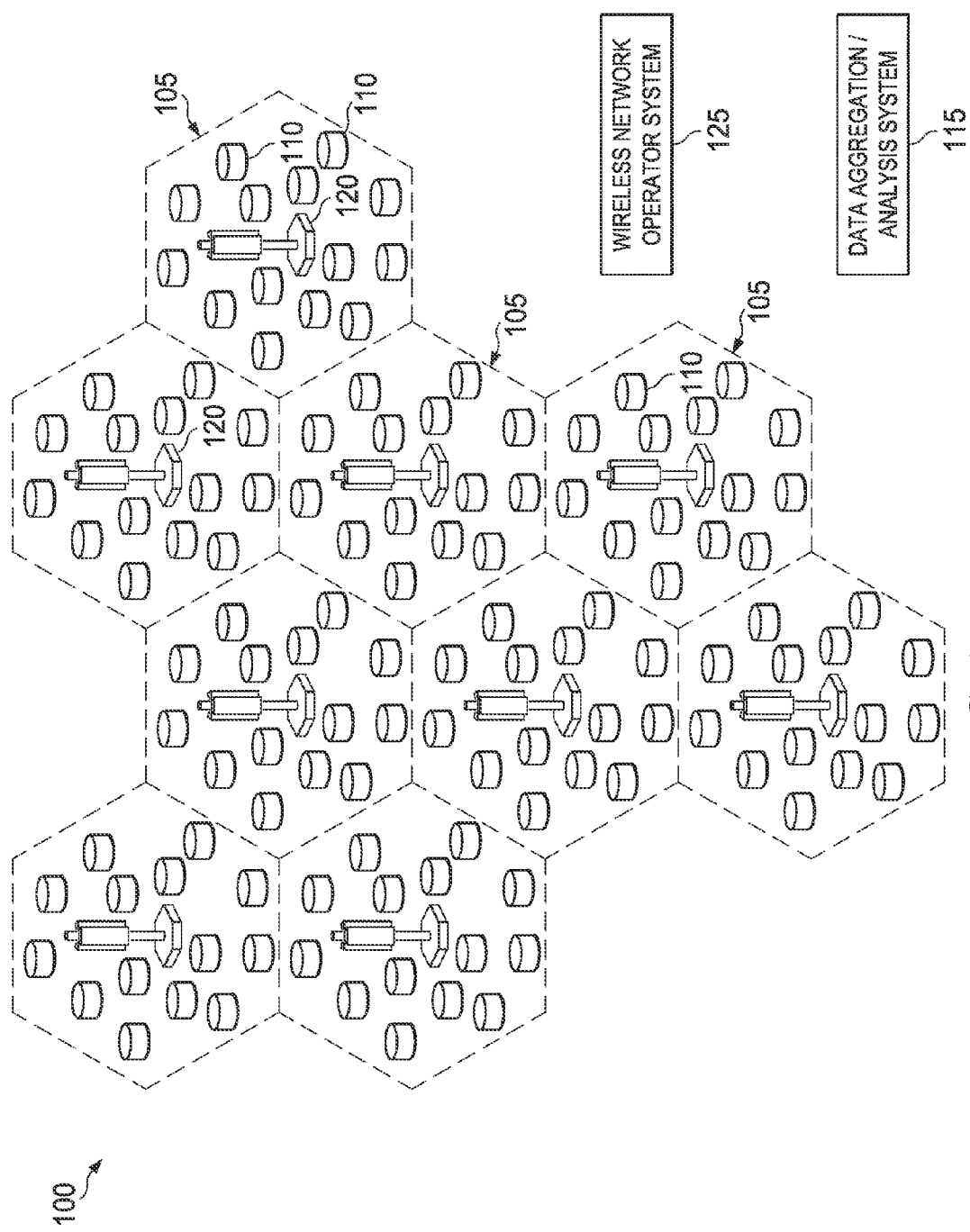
FIG. 1 is a block diagram showing an example wireless-spectrum analysis system that can provide feedback to a wireless network.

In some aspects of what is described here, a sensor network that includes wireless sensor devices distributed over a geographic region passively monitors wireless signals exchanged in a wireless communication network. The wireless communication network can be, for example, a cellular network, a Wi-Fi network, an ad hoc network, or another type of wireless communication network. In some instances, the wireless sensor devices compute network-usage parameters based on the wireless signals that they detect. The network-usage parameters computed by each individual wireless sensor device can be a local parameter that is based on the wireless signals detected in the local environment of the wireless sensor device. The local network-usage parameters computed by each individual wireless sensor device can be aggregated for analysis, for example, at a central server system.

In some implementations, a central server system can analyze regional performance metrics of the wireless communication network based on the aggregated network-usage parameters computed from the signals detected in the local environments of the individual wireless sensor devices. The regional performance metrics can include, for example, metrics related to the speed (or latency) of the wireless communication network, parameters related to dropped calls or dropped connections, or other types of performance metrics. The analysis of the regional performance metrics can describe the statistics, distribution, or other data relating to the geographic region that is covered by the sensor network. Thus, the regional performance metrics relate to a larger geographic area than is covered by a single wireless sensor device, and the analysis of the regional performance metrics is based on data from multiple disparate points throughout the region.

The data analysis system can provide its analysis to the wireless communication network, for example, so that the wireless communication network can monitor performance, detect performance issues, take corrective action, or perform other types of operations. The analysis of regional performance metrics can be provided to the wireless communication network as real-time data, as post-data, or a combination of these. In some instances, the analysis can be provided to a cellular network as real-time, dynamic feedback that allows the cellular network to monitor its own performance.

In some implementations, because the sensor devices of the sensor network are passive measurement devices and are not an active part of the wireless communication network, their presence does not create additional interference in the wireless communication network. Moreover, the wireless sensor devices can go beyond basic measurements (e.g., the types of measurements required by wireless standards, etc.), and can do more complex spectrum analysis, identify root causes of performance characteristics, or other types of relevant information. In some instances, the analysis of the network-usage parameters from the sensor network identifies performance deficiencies, which are reported back to the wireless communication network operator. In some instances, the report that is sent to the operator of the wireless communication network indicates the location and description of the problem, and the operator can use the report to find a solution to the problem. In some instances, the report that is sent to the operator of the wireless communication network includes a command to network infrastructure equipment to resolve the identified problem.

In some instances, after the wireless communication network has been modified to address a problem, the wireless sensor network can re-measure the network performance to determine whether the modification produced an improvement in the regional performance metric. In some instances, re-measuring the network performance confirms the desired improvement, or results in another incremental change being recommended to the network operator system.

Thus, the operator of the wireless communication network can modify operational parameters or network infrastructure based on feedback provided from the wireless sensor network. The modifications can be made in real time as the feedback is received, or the modifications can be made at other times (e.g., at scheduled maintenance periods, during low-usage periods, or at other times). A modification or other operation can be performed in real time, for example, by performing the operation in response to receiving data (e.g., from a sensor or monitoring system) without substantial delay. In some instances, an operation can be performed in real time by performing the operation while monitoring for additional data (e.g., while monitoring for additional wireless signals). Some real time operations can receive an input and produce an output within a time frame that allows the wireless communication network operator system to respond to the output, for example, by modifying ongoing operations of the wireless communication network.

In some implementations, changes that can be made in the wireless communication network in real time (or at other times) based on feedback from the sensor network can include, for example, changing a channel, frequency or band (e.g., if a currently used channel, frequency or band has a large degree of interference), changing transmit power characteristics (e.g. of the user equipment, of the base station, or both), changing a modulation scheme, a type of error correction, spreading factor, or other parameters to make a data channel more robust against noise interference. Other examples of changes that can be made in the wireless communication network include changing a radiation pattern of the base station antenna (e.g. by replacing or tilting an existing antenna, etc.), changing the physical configuration of a sector or cell of the wireless communication network, changing the maximum output power of the base station transmitter, and others.

In some instances, the data analysis system analyzes the regional performance metrics and determines that the wireless communication network is performing above target performance. In such instances, the data analysis system may or may not provide feedback to the wireless communication network. In some cases, the data analysis system sends a performance report to the wireless communication network indicating above-target performance, and the wireless communication network can make trade-offs to increase overall performance of the wireless communication network. For example, such trade-offs may be configured to make the wireless communication network more robust against interference, to increase throughput, to reduce network load, or to achieve other objectives. In a cellular network, such trade-offs can reach performance objectives, for example, by relaxing requirements to the base station and user equipment. For instance, in some cases, the maximum output power may be reduced without sacrificing performance, or higher-order modulation schemes can be used more aggressively to increase throughput.

In some implementations, the regional performance metric is analyzed by computing an observed value for the regional performance metric based on the local network-usage parameters received from multiple disparate locations in a region of interest. The observed value may be compared with a target value for the regional performance metric, and the network performance report can be transmitted in response to the comparison. For example, if the observed value is below a threshold, above a threshold, outside of a target range, etc., the data analysis system may automatically send a performance report to the wireless communication network.

In some cases, the wireless communication network includes a control system that analyzes the observed value and takes corrective action as appropriate. In some cases, the network performance report received by the wireless communication network includes commands for corrective action, and the wireless communication network may automatically implement the command without doing its own analysis of the observed value. In some cases, the network performance report indicates a location in the geographic region where observed performance of the wireless communication network does not meet a performance criterion specified by the wireless communication network. The network performance report may include a description of the observed performance, for example, based on the local network-usage parameters collected from the sensor network. The network performance report may include additional or different information.

In some implementations, the subject matter described here can be implemented in various manners that may provide additional technical advantages. For example, the wireless sensor devices can be low-cost devices. The number of wireless sensor devices deployed in an area, therefore, can be significantly higher than the number of base-stations in the same area. The sensor network interacts passively with the wireless communication network, and does not request or use services of the wireless communication network or otherwise interact directly as part of the wireless communication network. Thus, the sensor network can monitor performance of the wireless communication network without necessarily introducing an additional layer of complexity to the existing wireless communication network infrastructure, and without necessarily increasing complexity of the user equipment.

In some aspects of what is described here, wireless signals are monitored and analyzed over space and time. For example, parameters of the wireless signals can be aggregated from a number of wireless sensor devices that operate concurrently at various locations in a geographic region. The geographic region can be relatively small or large (e.g., having a radius ranging from tens or hundreds of meters to multiple kilometers) and can generally represent any area of interest (e.g., a building, city block, jurisdiction, demographic, industry, etc.). In some instances, the aggregated data can facilitate a realistic and comprehensive analysis of spectral usage and provide an understanding of the utilization and quality of wireless-spectrum and other resources in the geographic region.

In some implementations, wireless signals formatted according to various wireless communication standards are monitored and analyzed. For example, the wireless sensor devices can monitor and analyze 2G standards such as Global System for Mobile (GSM) and Enhanced Data rates for GSM Evolution (EDGE) or EGPRS; 3G standards such as Code division multiple access (CDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); wireless local area network (WLAN) or WiFi standards such as IEEE 802.11, Bluetooth, near-field communications (NFC), millimeter communications; or multiple of these or other types of wireless communication standards. In some implementations, other types of wireless communication (e.g., non-standardized signals and communication protocols) are monitored and analyzed.

In some instances, wireless-spectrum usage data and related information can be collected by or provided to (e.g., sold, subscribed, shared, or otherwise provided to) various entities. For example, wireless-spectrum usage data can be used by governmental agencies or regulatory authorities (e.g., Federal Communications Commission (FCC), etc.), standards-development organizations (e.g., 3rd Generation Partnership Project (3GPP), the Institute of Electrical and Electronics Engineers (IEEE), etc.), spectrum rights owners and licensees, wireless service providers, wireless device and chip manufacturers and vendors, end users of the wireless services, or other entities.

The wireless-spectrum usage data and related information can be used for a variety of purposes. For example, governmental agencies or regulatory authorities may use the information to better regulate, control, and enforce allocated or unallocated spectrum usage rights; standards-development organizations may use the information to choose operating frequencies and develop standards to balance spectrum load (e.g., by exploiting under-loaded frequency bands and offloading congested frequency bands); and service providers may use the information to optimize or otherwise improve system hardware, software, services, or infrastructure.

With more accurate and more comprehensive spectrum usage data, targeted schemes can be designed to improve the utilization of wireless-spectrum and other resources. In some instances, based on utilization and quality of the frequency bands that they own or operate on, spectrum rights owners and licensees or wireless service providers can design, modify, or otherwise manage their own spectrum usage. For example, given the knowledge that certain geographic locations experience heavy data traffic, wireless service providers may add base stations or modify a cell configuration (e.g., adjusting a frequency reuse scheme) to accommodate the heavy data traffic in the geographic locations. As another example, given the knowledge that certain times of day experience heavier data traffic than others, wireless service providers may design promotions or policies to encourage usage during other than peak hours.

In some examples, a wireless-spectrum analysis system includes a number of wireless sensor devices and a data analysis system. The wireless sensor devices can be distributed over various locations over a geographic region. The wireless sensor devices can monitor and analyze the RF spectrum at the respective locations and transmit information to the data analysis system. The data analysis system can serve as a central back-end system that aggregates, compiles, and analyzes information transmitted from the wireless sensor devices.

In some implementations, the wireless-spectrum analysis system and the individual wireless sensor device can perform various types of analysis in the frequency domain, the time domain, or both. For example, the wireless sensor devices may analyze the wireless spectrum in a frequency domain, in the time domain, or both. In some cases, the wireless sensor devices are configured to determine bandwidth, power spectral density, or other frequency attributes based on detected signals. In some cases, the wireless sensor devices are configured to perform demodulation and other operations to extract content from the wireless signals in the time domain such as, for example, signaling information included in the wireless signals (e.g., preambles, synchronization information, channel condition indicators, SSID/MAC address of a WiFi network, etc.).

In some examples, a wireless-spectrum analysis system provides a network performance report based on network-usage data from the devices. The network performance report can be provided to users (e.g., in a user interface), stored in a database (e.g., for analysis or archival purposes), transmitted to subscribers or other entities (e.g., governmental agencies or regulatory authorities, standards-development organizations, spectrum rights owners and licensees, wireless service providers, etc.), or output in another manner. In some instances, a network performance report can include text, data, tables, charts, graphs or other representations of wireless-spectrum usage.

In some examples, the network performance report can include frequency-domain information, time-domain information, spatial-domain information, or a combination of these and other knowledge gained from analyzing the wireless signals detected by the wireless sensor devices. The network performance report can include global information and higher-level knowledge based on the data from all multiple wireless sensor devices in disparate locations. For instance, the network performance report can include trends, statistics, patterns, coverage, network performance, or other information over time or space. In some implementations, the network performance report can be tailored or customized based on the business, preferences, or other attributes of a particular user or entity.

In some implementations, the network performance report is sent to the wireless communication network. The wireless communication network can use the network performance report, for example, to monitor network performance, to detect performance deficiencies, to correct performance deficiencies, or for a combination of these and other purposes. In some examples, the network performance report includes an analysis of regional performance metrics of the wireless communication network. The regional performance metrics can include, for example, an analysis of dropped calls, data transmission rates, data latency or other types of performance metrics. The regional performance metrics can be analyzed based on the network-usage parameters generated locally by each sensor device in the sensor network.

In some examples, a large number of wireless sensor devices can be used at distinct locations over a geographic region to concurrently monitor wireless signals at each distinct location. Accordingly, RF signals at various locations can be inspected at the same time or during overlapping time periods, which may render a more accurate and more comprehensive inspection of wireless signals over the geographic region. In some cases, wireless sensor devices monitor wireless signals at their respective locations passively, for example, by "listening" or "watching" for RF signals over a broad range of frequencies and processing the RF signals that they detect. There may be times when no RF signals are detected, and a wireless sensor device may process RF signals (e.g., from time to time or continuously) as they are detected in the local environment of the device.

In many instances, the wireless sensor devices can detect wireless signals that have been transmitted by or between other entities or systems, for example, on a particular frequency or set of frequencies, or by natural phenomena. The source, destination, context, and nature of the wireless signals can vary. Accordingly, the wireless sensor devices may monitor wireless-spectrum usage by a variety of systems, entities, or phenomena, and the systems described here are not limited to monitoring any particular type or class of systems or protocols.

In some cases, the wireless sensor devices can be implemented as relatively low-cost, compact, and lightweight devices. The small size and portability can, in some instances, expand the applicability and enhance the flexibility of the wireless-spectrum analysis system. In some instances, wireless sensor devices can be placed at or coupled to a pico/femto cell box of a cellular system, a WiFi access point or base station, a vehicle, a router, a mobile device (e.g., a smartphone, a tablet, etc.), a computer, an Internet of Things (e.g., machine to machine (M2M)) module, a cable modem box, a home gear electronic box (e.g., TV, modem, DVD, video game stations, laptops, kitchen gear, printers, lighting, phones, clocks, thermostats, fire detection units, $CO_2$ detection units, etc.), or other places.

In some implementations, a wireless sensor device can perform computations and analyses on the raw data (e.g., the detected RF signals) on the spot, to extract a digest of relevant information (e.g., network-usage parameters). In some implementations, instead of transmitting the raw data to the data analysis system, the wireless sensor devices transmit the digest extracted from the raw data, which may reduce data traffic, reduce power consumption (which may extend battery life, where applicable), and provide other advantages. In some cases, the raw data can be transmitted to the data analysis system, for example, upon request or in other instances.

In some implementations, communication between wireless sensor devices and a data aggregation and analysis system can be based on, for example, internet protocol (IP) transport or another standard data transport protocol, which may provide more efficient data transmission. In general, messages can be transmitted from the wireless sensor devices to the data aggregation and analysis system at any time. For example, the transmission can be triggered by detected usage of the RF spectrum, initiated by a request from the data aggregation and analysis system, sent according to a predetermined schedule or periodic intervals, or otherwise. In some instances, the system can request data from a particular wireless sensor device.

In some examples, the wireless sensor devices can be deployed and controlled from a back-end system. For example, the wireless sensor devices may operate without requiring a technician on site to operate the device. In some implementations, a data aggregation and analysis system or another type of central control system can execute control operations, for example, to configure or upgrade the wireless sensor devices. In some instances, the control system can request configuration information or run internal tests on any particular wireless sensor device.

FIG. 1 is a block diagram showing an example wireless-spectrum analysis system that can provide feedback to a wireless network. The example wireless-spectrum analysis system 100 shown in FIG. 1 includes a sensor network of wireless sensor devices 110 and a data aggregation and analysis system 115. As shown in FIG. 1, a number (e.g., tens, hundreds, or thousands) of wireless sensor devices 110 in the sensor network can be distributed over a geographic area encompassing multiple cells 105 of one or more cellular networks, with multiple wireless sensor devices 110 in each cell 105. In some implementations, the sensor network can include wireless sensor devices 110 distributed over another geographic region, for example, an area that does not include a cellular network. The wireless sensor devices 110 can be identical or similar to each other, or the wireless-spectrum analysis system 100 can include a variety of different wireless sensor devices 110.

As shown in FIG. 1, each cell 105 includes one or more base stations 120, which interface with user equipment (e.g., cellular phones, etc.) in a cellular network (e.g., a cellular voice network, cellular data network, etc.). Each cell 105 typically includes a single base station 120. Typically, the density of the base stations in a geographic region is determined based on a desired cell coverage and is computed during a cell planning stage and thus remains relatively fixed once the infrastructure has been deployed.

A base station 120 typically provides wireless service for mobile devices in a broad region, for example, over an entire cell 105. As such, the base stations 120 need enough power to transmit signals over a relatively large region, for example, to provide satisfactory cell coverage. Base stations typically use an array of high-power processors or high-power components with power consumption on the order of 10 Watts to 100 Watts or more, and may require cooling systems to maintain an operating temperature of the base station. For these and other reasons, base stations are often large, expensive systems. For example, a cellular base station is often composed of several antennas mounted on a tower and a building with electronics near the base of the tower, and a cellular base station can cost in the range of $100,000 to $1,000,000 or more, in some instances.

In the example shown, the wireless sensor devices 110 provide data to the data aggregation and analysis system 115. For example, the wireless sensor devices 110 may send messages (e.g., IP packets, Ethernet frames, etc.) to the data aggregation and analysis system 115 through an IP network, an Ethernet, or another communication system. For instance, the wireless-spectrum analysis system 100 may leverage existing communication and power infrastructure (e.g., public networks, private networks, wide area networks, etc.), other than (or including) the cellular networks supported by the base stations 120.

The example wireless sensor devices 110 can be modular or standalone devices that each monitor and analyze wireless signals in a local area. In some cases, the wireless sensor devices 110 passively interact with the cellular network, for example, without providing cellular service (e.g., to user equipment), without using the cellular network's radio resources, without supporting operation of the base stations 120, or without otherwise operating as a component of the cellular network. The wireless sensor devices 110 can include specialized hardware (e.g., customized circuits, customized chipsets, etc.) and specialized software (e.g., signal processing and analysis algorithms) for detecting and analyzing wireless signals.

In some instances, the wireless sensor devices 110 operate with low power consumption (e.g., around 0.1 to 0.2 Watts or less on average), and they can be relatively small and inexpensive. In some examples, an individual wireless sensor device can be smaller than a typical personal computer or laptop computer and can operate in a variety of environments. In some cases, the wireless sensor devices are modular, portable, compact devices that can be installed in office spaces, on urban infrastructure, in residential areas, on vehicles, or other locations. In some cases, a wireless sensor device can be manufactured for less than $100, although the actual cost will vary.

In the example shown in FIG. 1, the wireless sensor devices 110 are geographically distributed more densely than the base stations 120. As such, in some instances, the wireless sensor devices 110 can inspect the wireless-spectrum with higher location resolution and accuracy. As a particular example, a thousand wireless sensor devices 110 may be placed in various locations within a city, with approximately fifty wireless sensor devices 110 within each area of each cell 105, although the actual number will vary for individual applications. Each wireless sensor device 110 resides in a distinct location (i.e., a location that is physically distinguishable from the locations of the other wireless sensor devices 110).

The density of the wireless sensor devices 110 in a geographic area can be determined, for example, based on the area, population, location, or other factors of the geographic area. For instance, the density of the wireless sensor devices 110 in an urban area may be higher than in a rural area in some cases. In some cases, due to their relatively low cost and small size, the example wireless sensor devices 110 can be distributed throughout a cell 105 or another region of interest to provide a more economical solution for monitoring and analyzing wireless-spectrum usage throughout the region.

The wireless-spectrum analysis system 100 can be implemented, in some cases, with a high level of flexibility in system configuration and management. For example, the wireless sensor devices 110 can be portable, plug-and-play devices that can be relocated relatively easily, and can operate in a variety of locations. In some examples, the wireless sensor devices 110 have standard communication interfaces (e.g., Ethernet, WiFi, USB, etc.) and accept standard power or operate on battery power. Accordingly, the configuration of the wireless-spectrum analysis system 100 (e.g., the total number, density, and relative locations of the wireless sensor devices 110) can accommodate a variety of environments and can be modified or adjusted, for example, from time to time.

The example data aggregation and analysis system 115 can receive data (including measurements, a digest of relevant information, etc.) sent from the wireless sensor devices 110, store the data (e.g., in a database), and execute algorithms that process the aggregated data from the database to extract higher-level information. The higher-level information can include, for example, trends, performance data, statistics, coverage, network usage, or any other local or global information associated with the wireless sensor devices 110. The data aggregation and analysis system 115 may also control operation of the wireless sensor devices 110 and interact with them individually, for example, to request particular data, or to perform other control operations. In some cases, the data aggregation and analysis system 115 analyzes performance metrics of the wireless communication network and sends performance data to the wireless communication network based on its analysis. For example, the data aggregation and analysis system 115 can send a performance report to the wireless network operator system 125.

In the example shown, the wireless communication network that includes the base stations 120 is operated by the wireless network operator system 125. The example wireless network operator system 125 can be implemented as a computing system or a collection of computing systems and other types of hardware. The wireless network operator system 125 can be, or may include components that are, located near one or more of the base stations 120. In some cases, some or all components of the wireless network operator system 125 are located remote from the base stations 120. In some implementations, the wireless network operator system 125 receives a performance report from the data aggregation and analysis system 115. The wireless network operator system 125 may analyze performance data in the performance report, identify corrective or remedial actions based on the analysis, execute commands included in the performance report, or take other types of actions in response receiving the performance report.

Figure 2A:
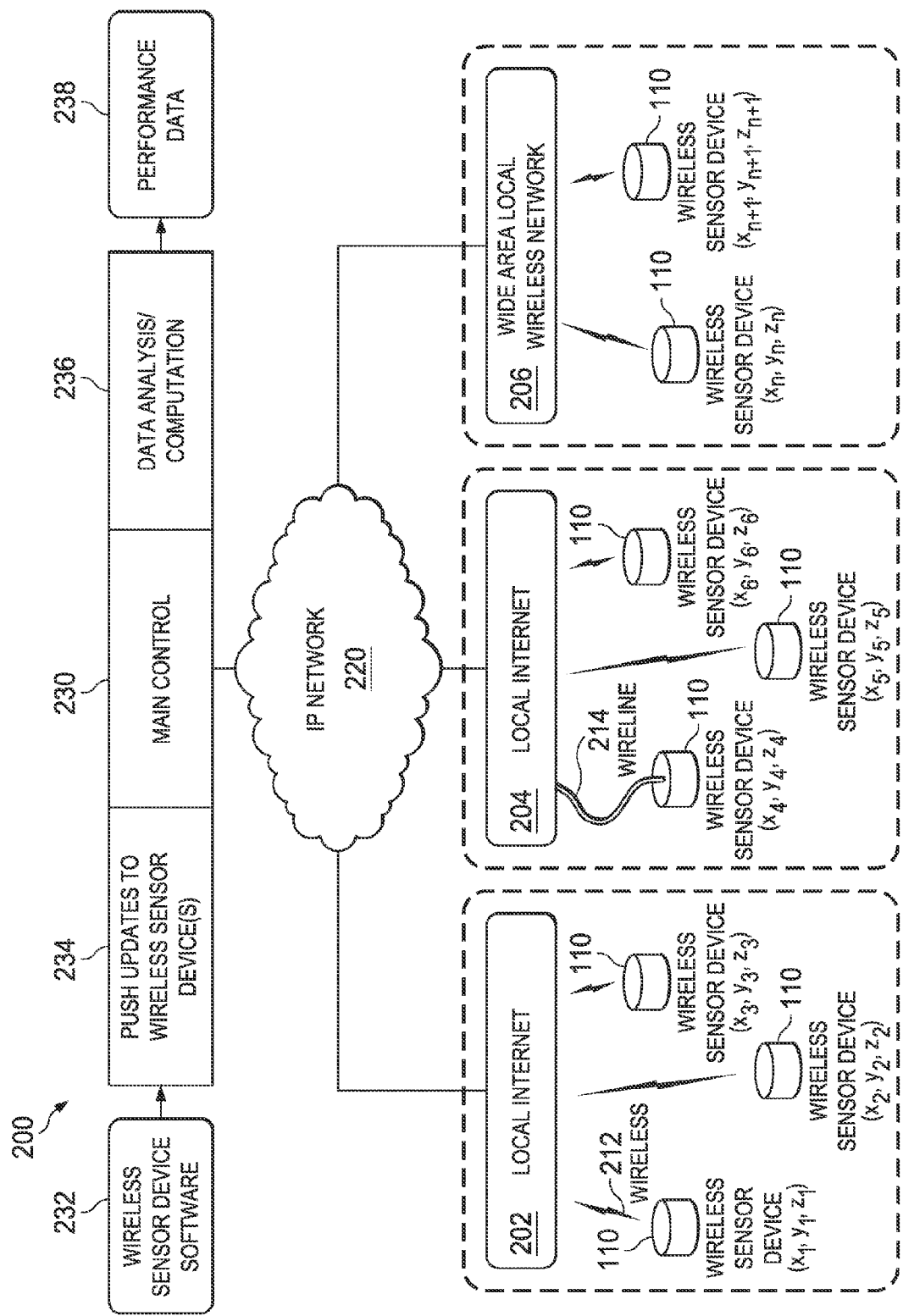

FIGS. 2A and 2B are block diagrams showing architecture of an example wireless-spectrum analysis system that provides feedback to a wireless network. The wireless-spectrum analysis system 200 can represent the wireless-spectrum analysis system 100 of FIG. 1, or another wireless-spectrum analysis system. The example wireless-spectrum analysis system 200 includes a number of wireless sensor devices 110, an IP network 220, and a main controller 230. The wireless-spectrum analysis system 200 can include additional or different components. In some implementations, a wireless-spectrum analysis system can be arranged as shown in FIGS. 2A and 2B or in another suitable manner.

In the example shown in FIG. 2A, each wireless sensor device 110 is implemented as a wireless sensor device at a respective physical location having spatial coordinates ($x_i$, $y_i$, $z_i$), where i varies from 1 to L (L is the number of the wireless sensor devices 110). In some implementations, each wireless sensor device can include a Global Positioning System (GPS) or another location identification system that identifies the location coordinates of the wireless sensor device, or the location coordinates can be identified in another manner. In some implementations, each wireless sensor device has a unique identifier, and the identifier can be associated with a location identifier or location coordinates.

The example wireless sensor devices can monitor and analyze wireless-spectrum in both frequency and time domains and perform in-depth analyses of wireless communication services available at the associated geographic location. For instance, the wireless sensor device can detect an RF signal in a local wireless environment about the location of the wireless sensor device at any given time. In some instances, the wireless sensor device can identify data packets and frames, extract synchronization information, cells and services identifiers, and quality measurements of RF channels (e.g., channel quality indicator (CQI)), and derive network-usage parameters and other information based on these and other control information and traffic data of the RF signal detected by the wireless sensor device. The control information and traffic data of the RF signal can include physical and medium access (MAC) layers information corresponding to a wireless communication standard such as 2G GSM/EDGE, 3G/CDMA/UMTS/TD-SCDMA, 4G/LTE/LTE-A, WiFi, Bluetooth, etc. The network-usage parameters (e.g., for particular frequencies or particular bandwidths, etc.) can include the power of detected RF signals, the signal-to-noise ratio (SNR) of detected RF signals, the frequency at which detected RF signals have maximum power, or other parameters. In some implementations, the wireless sensor device can identify RF jammers and interferers, or other types of information.

In the example shown in FIG. 2A, data from the wireless sensor devices (e.g., network-usage data, or other information) are aggregated by a data aggregation or central control system (e.g., the main controller 230). In some implementations, data from the wireless sensor devices are aggregated by the main controller 230 by receiving the messages transmitted from the wireless sensor devices, for example, through the IP network (e.g., the IP network 220). In some implementations, the wireless sensor devices are connected to the IP network 220 via a local network (e.g., a local internet 202 or 204). The wireless sensor devices can be connected to the local network by a local wireline network 214 or a wireless network 212. The wireline network 214 can include, for example, Ethernet, xDSL (x-digital subscriber line), optical network, or other types of wireline communication networks. The wireless network 212 can include, for example, WiFi, Bluetooth, NFC, or other types of local wireless networks. In some implementations, some of the wireless sensor devices are connected directly to the IP network 220 using one or more wide area networks 206. The wide area networks 206 can include, for example, cellular network, satellite network, or other types of wide area networks.

The example main controller 230 can be included in the data aggregation and analysis system 115 of FIG. 1 or another back-end system. The main controller 230 can be a computing system that includes one or more computing devices or systems. The main controller 230 or any of its components can be located at a data processing center, a computing facility, or another location. In the example shown, the main controller 230 can remotely control operation of the wireless sensor devices. Example functions of the main controller 230 can include aggregating the information from some or all of the wireless sensor devices, upgrading the wireless sensor device software, monitoring states of the wireless sensor devices, etc. For example, the main controller 230 can include or be coupled to a software update module 234. In some cases, the software update module 234 can receive update for the wireless sensor device software 232, and push the software updates to wireless sensor devices.

In the example shown in FIG. 2A, the main controller 230 can put the wireless sensor devices into one or more calibration or test modes, reset various elements within the wireless sensor devices, or configure any individual wireless sensor device as necessary, for example, based on the location or state of the wireless sensor device, its neighboring wireless sensor devices, or other factors. In some examples, the states of a wireless sensor device can include: (i) the temperature of the wireless sensor device, (ii) the current power consumption of the wireless sensor device, (iii) the data rate flowing from the wireless sensor device back to the main controller 230, (iv) the signal strength, SSID's, or MAC addresses of the local WiFi signals around the wireless sensor device, (v) the location of the wireless sensor device (e.g., detecting an internal GPS unit in the wireless sensor device), (vi) a signal (e.g., IP packets, control signaling transmitted over the network) that provides information on the state of the wireless sensor device or its surrounding wireless sensor devices. The main controller 230 may monitor additional or different states of the wireless sensor devices.

In some implementations, the main controller 230 can include or be coupled to a communication system that receives spectrum inspection information (e.g., network-usage data, spatial and temporal coordinates for the network-usage data, states of the wireless sensor devices, etc.) transmitted from the wireless sensor devices. The main controller 230 can include or be coupled to a data analysis system 236 that can aggregate (e.g., assemble, compile, or otherwise manage) the spectrum inspection information from the multiple wireless sensor devices and generate performance data 238 for the geographic region based on the network-usage parameters from the wireless sensor devices.

Figure 3:
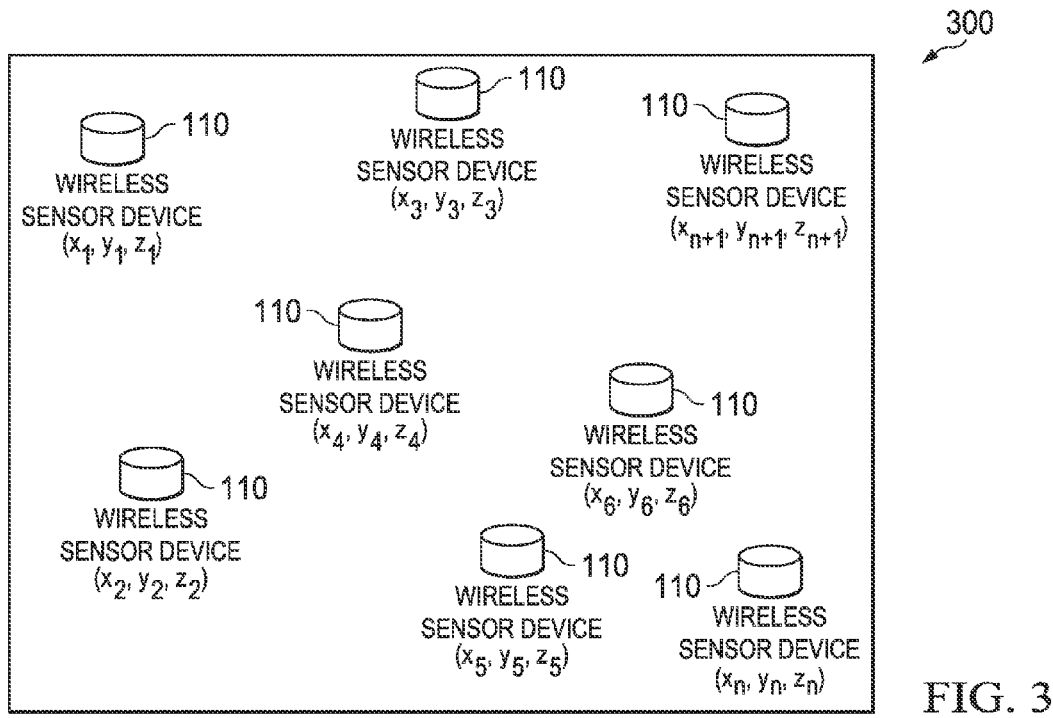
FIG. 3 is a block diagram showing an example distribution of wireless sensor devices.
Figure 4:
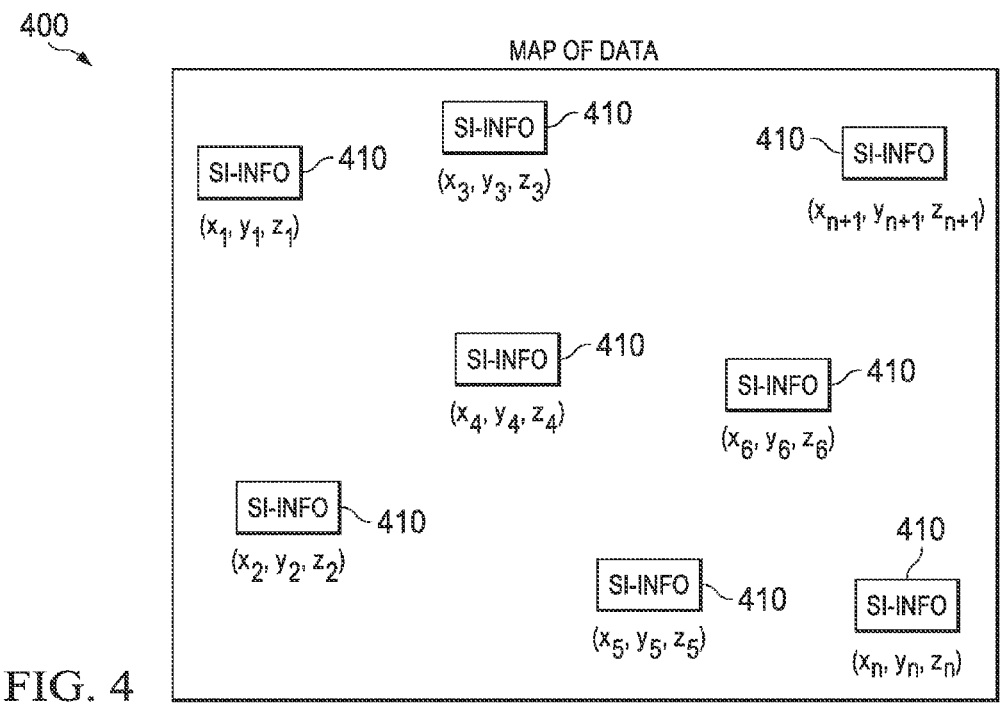
FIG. 4 is a block diagram showing example spectrum inspection (SI) information associated with wireless sensor devices.
Figure 5:
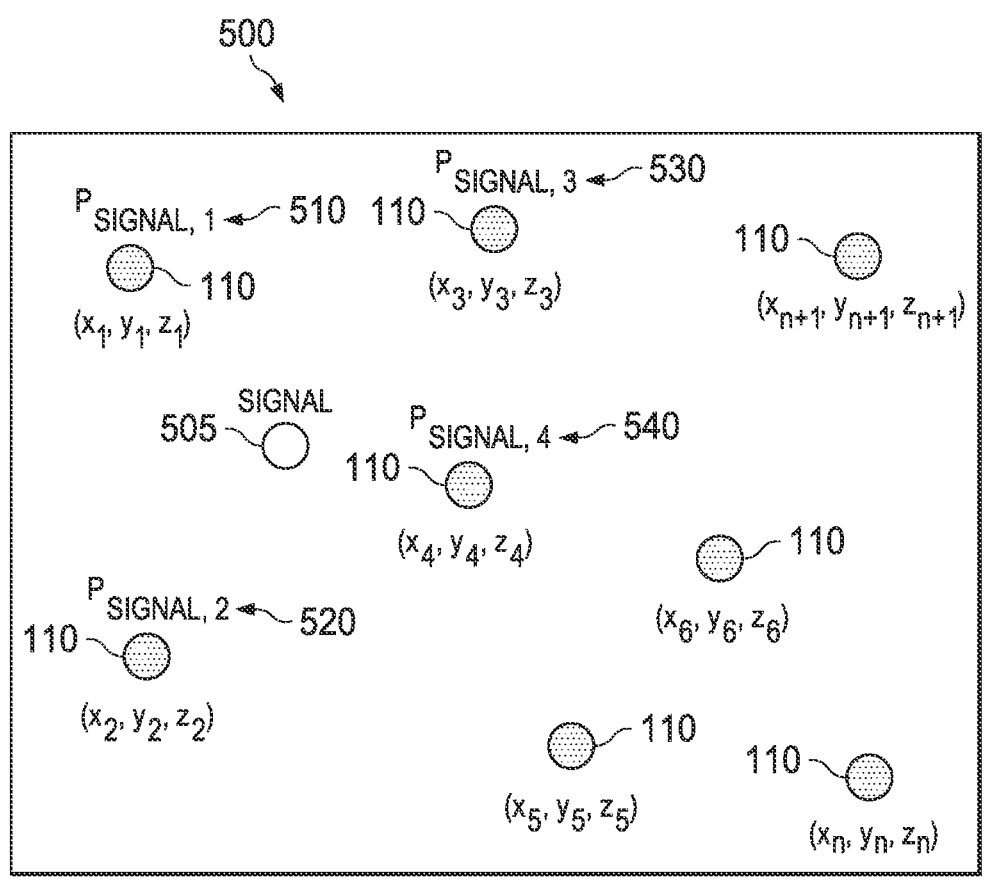
FIG. 5 is another block diagram showing example SI information associated with wireless sensor devices.

In some instances, network performance data 238 can be included in a network performance report. For example, the network performance report can indicate detected wireless traffic levels in each of the multiple bandwidths in an RF spectrum, detected wireless traffic levels for multiple wireless communication standards, spatial and temporal distributions of wireless-spectrum usage in the geographic region, or other information. The traffic levels can include, for example, throughput, data rate, peak and valley values, or other statistics (e.g., average and variance) of the network-usage information. The network performance report can be generated based on analyzing real-time data, historical data, or a combination of both. The network performance report can include, for example, tables, charts, and graphs showing the detected wireless traffic levels versus space and time. For instance, the network performance report can include a graph or map (e.g., as shown in FIGS. 3-5) showing the spatial distribution of wireless-spectrum usage in the geographic region. The network performance report can include a bar chart or table showing the temporal distribution or trends of wireless-spectrum usage (e.g., showing the peak, average, and valley traffic amount during a day, a month, or a year).

In some instances, the network performance report includes performance data generated by analysis of network performance metrics. The network performance metrics may be analyzed based on network-usage parameters computed by the wireless sensor devices 110. In some instances, the network-usage parameters computed by the wireless sensor devices 110 indicate network-usage detected in the local environment of the individual devices, and the performance metrics are analyzed on a regional scale that covers many of the wireless sensor devices 110. For instance, a regional performance report can include performance data for all or part of a cell in a cellular network or for multiple cells in a cellular network. In some examples, a regional performance report may include performance data for a city block, a building or campus, or another area of interest. In some cases, the regional performance report is generated based on network-usage parameters received from tens or hundreds of wireless sensor devices 110 distributed over tens, hundreds or thousands of square meters.

FIG. 2B shows an example wireless network operator system 250 configured to receive performance data from a data analysis system. In the example shown, the wireless network operator system 250 includes a feedback interface 284, a performance analysis system 285 and a control system 286. A wireless network operator system may include additional or different features, and the components of a wireless network operator system may operate as shown in FIG. 2B or in another manner.

In the example shown in FIG. 2B, the data analysis system 236 (e.g., as shown in FIG. 2A) includes a reporting interface that is configured to transmit a network performance report to the wireless network operator system 250. The network performance report can be delivered to the wireless network operator system, for example, over an IP network 260 or another type of communication network. The IP network 260 shown in FIG. 2B can be the IP network 220 shown in FIG. 2A or another IP network. As shown in FIG. 2B, the feedback interface 284 receives the network performance report from the reporting interface of the data analysis system 236.

The example wireless network operator system 250 also receives target performance metrics 282. The target performance metrics can be determined by the wireless communication network, for example, based on the needs or desires of network users, based on parameters set by the network operator, or based on other factors. The target performance metrics can indicate, for example, target communication rates, target network loads, or other types of performance metrics. In some examples, the wireless communication network is a cellular network, and the target performance metrics 282 indicate a maximum rate or a maximum number of dropped calls in the cellular network. In some examples, the wireless communication network is a cellular network, and the target performance metrics 282 indicate minimum data transmission rates, maximum data latency rates, or other parameters relating to network speed. Data transmission rates are typically measured in megabits per second, but may be measured in other units.

In some cases, the actual performance of the wireless communication network does not meet the target performance metrics 282. For example, the wireless communication network may experience radio interference, unexpected network loads, equipment malfunctions, attacks or abusive actions, software malfunctions, power outages, or other types of events that can affect performance of the wireless communication network. The performance analysis system 285 can analyze the network performance data from the data analysis system 236 against the target performance metrics 282. For example, the performance analysis system 285 may compare the number or rate of dropped calls in the cellular network against a target number or rate specified in the target performance metrics 282. As another example, the performance analysis system 285 may compare the observed data rates (e.g. maximum data rates, average daily rates, minimum data rates, etc.) against data rates specified in the target performance metrics 282. The performance data for the wireless communication network can be averaged over space, over time, or both for comparison against the target performance metrics 282.

The example control system 286 controls operation of one or more aspects of the wireless communication network. For example, the control system 286 may control software, hardware, firmware or a combination of these within the wireless communication network. As shown in FIG. 2B, the control system 286 can interact with network infrastructure 287, can control operating parameters 288, or can do both to control operation of the wireless communication network. In some instances, the network infrastructure 287 may include base stations, radio towers, radio antennae or other types of radio hardware, electrical systems, computer systems or a combination of these and other components. In some instances, the operating parameters 288 can include operating frequencies, operating channels, operating bands, antenna angles, transmit power characteristics (e.g., transmit power control loop dynamics, transmit power levels, etc.), modulation schemes, error correction schemes, spreading factors, or a combination of these and other parameters.

In some implementations, the control system 286 identifies modifications for the wireless communication network based on the network performance analysis provided by the performance analysis system 285. For example, the control system 286 may identify one or more corrective actions to address network performance that does not meet the target performance metrics 282. In some cases, the control system 286 generates commands for the network infrastructure 287, modifies one or more of the operating parameters 288, or takes other types of actions to correct the performance deficiencies in the wireless communication network. The commands or parameter settings identified by the control system 286 can be delivered to the network infrastructure in real time as the commands are generated, at pre-scheduled maintenance periods, or at other times.

In some instances, the data analysis system 236 receives the target performance metrics 282 and executes the network performance analysis described above with respect to the performance analysis system 285. In such cases, the data analysis system 236 can include the results of its analysis in the network performance report that is transmitted to the wireless network operator system 250. In some instances, the data analysis system 236 identifies corrective actions and generates commands as described above with respect to the control system 286. In such cases, the data analysis system can include the commands in the network performance report that is transmitted to the wireless network operator system 250. The wireless network operator system 250 may, in some cases, automatically implement the commands generated by the data analysis system 236, or the network operator system 250 may selectively implement the commands based on its own selection criteria.

FIGS. 3 and 4 show aspects of example spatial and temporal distributions of wireless-spectrum usage in a geographic region; FIG. 5 shows aspects of example techniques for determining the source location. In some instances, similar or related information can be included in a network performance report generated by the main controller 230 and displayed to the users. In some implementations, the network performance report can include additional or different representations of the network-usage information.

FIG. 3 is a block diagram 300 showing an example spatial distribution of wireless sensor devices. As shown in FIG. 3, each wireless sensor device has a geographic location $(x_i, y_i, z_i)$ and can monitor and analyze the wireless-spectrum at its respective geographic location $(x_i, y_i, z_i)$. Each wireless sensor device can transmit spectrum inspection (SI) information to a data analysis system (e.g., the main controller 230 in FIG. 2A). The SI information can include, for example, network data (e.g., network-usage parameters), location and time information for each network-usage parameter, state information of the wireless sensor device, or other information. For example, the location and time information can include spatial coordinates of the wireless sensor device (e.g., $(x_i, y_i, z_i)$ or in other coordinates) and temporal coordinates (e.g., a time of day) at which each of the network-usage parameters is obtained. The example block diagram 300 shows the spatial coordinates of the wireless sensor devices and serves as a map of the example spatial distribution of the wireless sensor devices in a geographic region. In some implementations, the SI information of each wireless sensor device can be superimposed onto the diagram 300 and displayed, for example, to a user.

FIG. 4 is block diagram 400 showing example SI information 410 associated with the wireless sensor devices shown in FIG. 3. In the example shown in FIG. 4, the example SI information 410 can be displayed adjacent to or on top of the respective spatial coordinates of the wireless sensor devices. The displayed SI information 410 can include some or all types of SI information described above. For example, one or more of the network-usage parameters can be displayed. In some implementations, temporal coordinates for each of the network-usage parameters can also be displayed. The information can be the same, similar, or different for each distinct wireless sensor device. Because the SI information 410 can be aggregated at a central location (e.g., the main controller 230), the SI information 410 of multiple wireless sensor devices can be correlated, compared, interpolated, or otherwise manipulated to derive further information. For example, the relative position of a source signal can be determined based on SI information of the wireless sensor devices that can detect the source signal. Additional or different information can be derived.

FIG. 5 is another block diagram 500 showing example SI information associated with the wireless sensor devices shown in FIG. 3. In this example, a detected signal power at one or more frequencies is displayed as the example SI information for each wireless sensor device at its respective location. The measured power of the signal at frequency f at locations $(x_1, y_1, z_1)$, $(x_2, y_2, z_2)$, $(x_3, y_3, z_3)$, and $(x_4, y_4, z_4)$ are denoted as $P_{signal,1}$ 510, $P_{signal,2}$ 520, $P_{signal,3}$ 530, and $P_{signal,4}$ 540, respectively. Based on the measured power levels of the multiple wireless sensor devices, the source location of the signal 505 at frequency f can be estimated, for example, automatically by a data analysis system (e.g., of the central controller). For example, the source location of the signal 505 can be determined based on the intersection of multiple arcs centered at the locations of the wireless sensor devices, e.g., $(x_1, y_1, z_1)$, $(x_2, y_2, z_2)$, $(x_3, y_3, z_3)$, and $(x_4, y_4, z_4)$. The radius of each arc can be determined based on the $P_{signal,1}$ 510, $P_{signal,2}$ 520, $P_{signal,3}$ 530, and $P_{signal,4}$ 540, the respective path losses, shadowing effects, or other propagation conditions in the local wireless environment about each of the multiple wireless sensor devices. Accordingly, the source location of the RF signals can be pinpointed and illustrated on the example map for visualization. The source location can also be identified based on a synchronization signal or other techniques.

Figure 6:
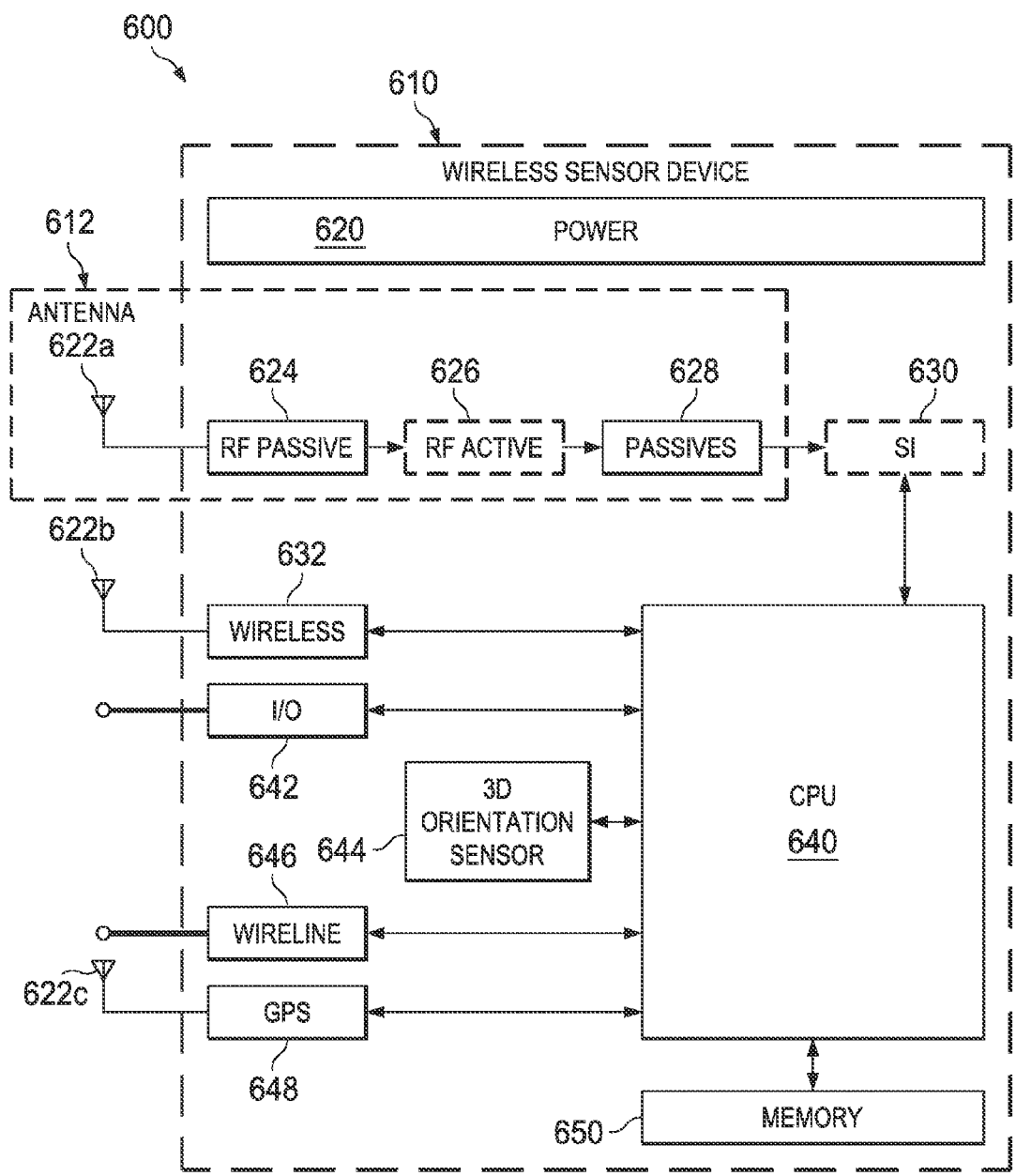
FIG. 6 is a block diagram showing an example wireless sensor device.

FIG. 6 is a block diagram showing an example wireless sensor device 600. In some cases, the wireless sensor devices of FIGS. 1-5 can be implemented as the example wireless sensor device 600 shown in FIG. 6 or as another type of wireless sensor device. The example wireless sensor device 600 includes a housing 610, an RF interface 612, a power management subsystem 620, a signal analysis subsystem (e.g., the SI subsystem 630, etc.), a CPU 640, a memory 650, communication interfaces, an input/output interface 642 (e.g., a USB connection), a GPS interface 648, and one or more sensors (e.g., 3D orientation sensors 644 such as a compass or gyroscope, temperature sensors, etc.). The wireless sensor device 600 can include additional or different components and features, and the features of the wireless sensor device can be arranged as shown in FIG. 6 or in another suitable configuration.

In some implementations, the housing 610 can be a portable housing that houses the RF interface 612, the power management subsystem 620, the signal analysis subsystem, the communication interfaces, and other components of the wireless sensor device 600. The housing can be made of plastic, metal, composites, or a combination of these and other materials. The housing can include components that are manufactured by molding, machining, extruding, or other types of processes. In some implementations, the wireless sensor device 600 can be coupled to or integrated with another device (e.g., a pico/femto cell box of a cellular system, a WiFi access point or base station, a vehicle, a router, a mobile device, a thermostat, etc.). For example, the housing 610 of the wireless sensor device 600 can be attached to, incorporated, or otherwise coupled to the other device. Alternatively, the housing 610 can be a dedicated housing that houses only the components of the wireless sensor device 600.

In some implementations, the design and arrangement of the housing 610 and components inside the housing 610 can be optimized or otherwise configured for monitoring and analyzing wireless signals. For example, the sizes, orientations, and relative locations of the components can be optimized for detecting and analyzing RF signals, and the device can be compact while accommodating all the necessary components. In some instances, the housing 610 can be on the order of, for example, $10 \times 10 \times 4$ cm$^3$, or another size housing can be used.

In some implementations, the RF interface 612 is configured to detect RF signals in multiple bandwidths of an RF spectrum in a local wireless environment about the wireless sensor device 600. The RF interface 612 can include an antenna system and multiple radio paths that are configured to process RF signals in the respective bandwidths. In the example shown in FIG. 6, the RF interface 612 includes an antenna 622a, RF passive elements 624, RF active elements 626, and passive elements 628. The RF passive elements 624 can include, for example, matching elements, RF switches, and filters. The RF active elements 626 can include, for example, RF amplifiers. The passive elements 628 after the RF active elements 626 can include, for example, filters, matching elements, switches, and baluns.

In some examples, the signal analysis subsystem can be configured to identify the network-usage data based on the RF signals. A signal analysis subsystem can include radio(s), digital signal processor (DSP), memory, and other components for extracting spectral parameters and for analyzing the RF spectrum. In some implementations, the combination of the RF interface 612 and the signal analysis subsystem can be referred to as a spectrum inspection (SI) signal path, which is described in greater detail with respect to FIG. 7.

The communication interfaces of the wireless sensor device 600 can be configured to transmit the network-usage parameters or other SI information to a remote system (e.g., the main controller 230 of FIG. 2A). The communication interfaces can include one or more wireless interfaces 632 (e.g., a WiFi connection, cellular connection, etc.), a wireline interface 646 to a local network (e.g., an Ethernet connection, xDSL connection, etc.), or other types of communication links or channels. The communication interfaces can share and reuse the common antennas (e.g., using an antenna array) or they can each have distinct and dedicated antennas.

The wireless interface 632 and the wireline interface 646 can each include a modem to communicate with the local or wide area network. For example, the wireless interface 632 and the wireline interface 646 can send SI information to a data analysis system (e.g., the main controller 230 of FIG. 2A) and receive control information (e.g., software updates) from the data analysis system, via the local or wide area network. In some implementations, a wireless sensor device can be equipped with either or both of the communication interfaces. The wireline interface 646 can allow the example wireless sensor device 600 to exploit existing wireline communication infrastructure (e.g., in a building) and large transmission capacity of wireline communications (e.g., large bandwidth provided by optical network, advanced digital subscriber line technologies, etc.). The wireless interface 632 can enhance the mobility and flexibility of the example wireless sensor device 600 such that it can deliver SI information at a variety of locations and times, using Bluetooth, WiFi, cellular, satellite, or other wireless communication technologies.

In some implementations, the wireless interface 632 and the RF interface 612 can share hardware or software components (or both). In some implementations, the wireless interface 632 and the RF interface 612 can be implemented separately. In some implementations, the RF interface 612 is mainly responsible for signal reception rather than transmission, and the RF interface 612 can be implemented with specialized lower-power circuitry and thus reduce the overall power consumption of the wireless sensor device 600.

The power management subsystem 620 can include circuits and software for providing and managing power to the wireless sensor device 600. In some implementations, the power management subsystem 620 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the wireless sensor device 600. As such, the wireless sensor device 600 can include a self-contained power supply and can be used at arbitrary locations without need for other external energy sources. Additionally or alternatively, the power management subsystem 620 can include an external power interface that receives power from an external source (e.g., an alternating current power source, an adapter, a converter, etc.). As such, the wireless sensor device 600 can be plugged into an external energy source.

In some implementations, the power management subsystem 620 can oversee and manage power consumption of the wireless sensor device 600. For example, the power management subsystem 620 can monitor the power consumption of the RF interface 612, communication interfaces, the CPU 640, and other components of the wireless sensor device 600, and report the power consumption state of the wireless sensor device 600, for example, to a central controller. In some implementations, the wireless sensor device 600 can be designed to have low power consumption, and the power management subsystem 620 can be configured to send an alert to the central controller or intervene with the operations of the wireless sensor device 600 if the power consumption exceeds a threshold. The power management subsystem 620 can include additional or different features.

The CPU 640 can include one or more processors or another type of data-processing apparatus that can execute instructions, for example, to manage the operations of the wireless sensor device 600. The CPU 640 may perform or manage one or more of the operations of a wireless sensor device described with respect to FIGS. 1-5. In some implementations, the CPU 640 can be part of the SI subsystem 630. For example, the CPU 640 can process, compute, and otherwise analyze the measured wireless-spectrum data (e.g., from the RF interface 612). In some cases, the CPU 640 can execute or interpret software, scripts, programs, functions, executables, or other modules contained in the memory 650.

The input/output interface 642 can be coupled to input/output devices (e.g., a USB flash drive, a display, a keyboard, or other input/output devices). The input/output interface 642 can assist data transfer between the wireless sensor device 600 and the external storage or display device, for example, over communication links such as a serial link, a parallel link, a wireless link (e.g., infrared, radio frequency, or others), or another type of link.

The memory 650 can include, for example, a random access memory (RAM), a storage device (e.g., a writable read-only memory (ROM) or others), a hard disk, or another type of storage medium. The memory 650 can store instructions (e.g., computer code) associated with operations of the wireless sensor device 600, a main controller, and other components in a wireless-spectrum analysis system. The memory 650 can also store application data and data objects that can be interpreted by one or more applications or virtual machines running on the wireless sensor device 600. The memory 650 can store, for example, location data, environment data, and state data of the wireless sensor device 600, wireless-spectrum data, and other data.

In some implementations, the wireless sensor device 600 can be programmed or updated (e.g., reprogrammed) by loading a program from another source (e.g., from a central controller through a data network, a CD-ROM, or another computer device in another manner). In some instances, the central controller pushes software updates to the wireless sensor device 600 as the updates become available, according to a predetermined schedule, or in another manner.

Figure 7:
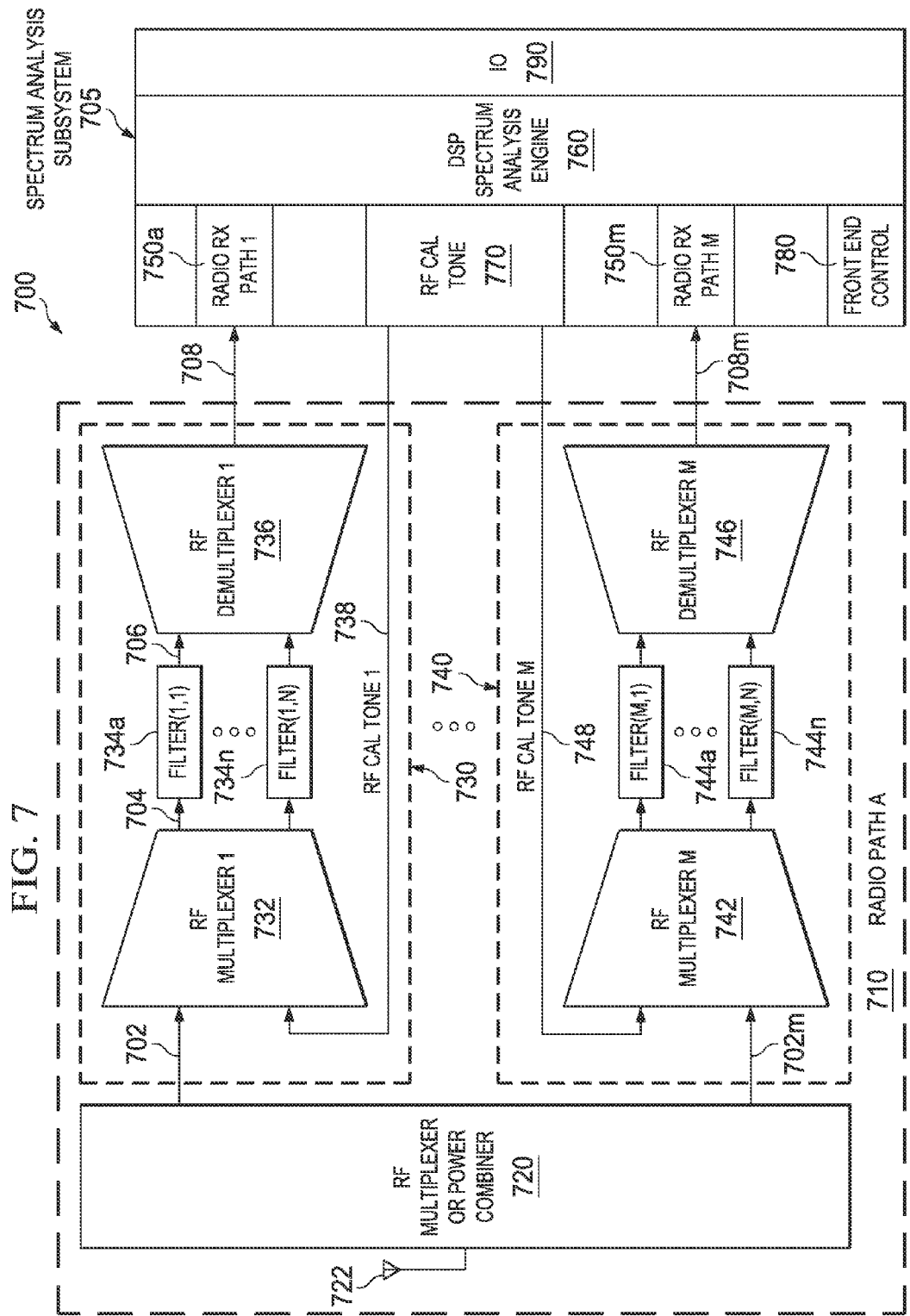
FIG. 7 is a block diagram showing an example SI signal path of a wireless sensor device.

FIG. 7 is a block diagram showing an example spectrum inspection (SI) signal path 700. The SI signal path 700 includes an RF interface 710 (e.g., denoted as Radio Path A) and a spectrum analysis subsystem 705. The RF interface 612 of the wireless sensor device 600 of FIG. 6 can be implemented as the example RF interface 710 in FIG. 7 or in another manner. The SI subsystem 630 of the wireless sensor device 600 of FIG. 6 can be implemented as the example spectrum analysis subsystem 705 in FIG. 7 or in another manner. In some cases, the SI signal path 700 can perform all necessary operations for monitoring and analyzing the wireless signals. For example, the SI signal path 700 can perform functions of a typical wireless receiver such as demodulation, equalization, channel decoding, etc. The SI signal path 700 can support signal reception of various wireless communication standards and access the spectrum analysis subsystem 705 for analyzing the wireless signals.

In the example shown, the RF interface 710 can be a wideband or narrowband front-end chipset for detecting and processing RF signals. For example, the RF interface 710 can be configured to detect RF signals in a wide spectrum of one or more frequency bands, or a narrow spectrum within a specific frequency band of a wireless communication standard. In some implementations, an SI signal path 700 can include one or more RF interfaces 710 to cover the spectrum of interest. Example implementations of such an SI signal path are described with respect to FIG. 8.

In the example shown in FIG. 7, the RF interface 710 includes one or more antennas 722, an RF multiplexer 720 or power combiner (e.g., an RF switch), and one or more signal processing paths (e.g., "path 1" 730, . . . , "path M" 740). The antenna 722 could be a multi-port antenna or single-port antenna. The antenna 722 can include an omni-directional antenna, a directional antenna, or a combination of one or more of each. The antenna 722 is connected to an RF multiplexer 720. In some implementations, the RF interface 710 can be configured to use the one or more antennas 722 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of a wireless sensor device can be picked up by the antenna 722 and input into the RF multiplexer 720. Depending on the frequency of the RF signal that needs to be analyzed, the signal 702 output from the RF multiplexer 720 can be routed to one of the processing paths (i.e., "path 1" 730, . . . , "path M" 740). Here, M is an integer. Each path can include a distinct frequency band. For example, "path 1" 730 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 730 may be used for detecting LTE signals, while the "path M" 740 may be used for detecting WiFi signals.

Each processing path (e.g., "processing path 1" 730, "processing path M" 740) can include one or more RF passive and RF active elements. For example, the processing path can include an RF multiplexer, one or more filters, an RF de-multiplexer, an RF amplifier, and other components. In some implementations, the signals 702, 702m output from the RF multiplexer 720 can be applied to a multiplexer in a processing path (e.g., "RF multiplexer 1" 732, . . . , "RF multiplexer M" 742). For example, if "processing path 1" 730 is selected as the processing path for the signal 702, the signal 702 can be fed into "RF multiplexer 1" 732. The RF multiplexer can choose between the signal 702 coming from the first RF multiplexer 720 or the RF calibration (cal) tone 738 provided by the spectrum analysis subsystem 705. The output signal 704 of "RF multiplexer 1" 732 can go to one of the filters, Filter (1,1) 734a, . . . , Filter (1,N) 734n, where N is an integer. The filters further divide the frequency band of the processing path into a narrower band of interest. For example, "Filter (1,1)" 734a can be applied to the signal 704 to produce a filtered signal 706, and the filtered signal 706 can be applied to "RF de-multiplexer 1" 736. In some instances, the signal 706 can be amplified in the RF de-multiplexer. The amplified signal 708 can then be input into the spectrum analysis subsystem 705.

Similarly, if "processing path M" 740 is selected as the processing path for the signal 702m, the signal 702m can be fed into "RF multiplexer M" 742. The RF multiplexer can choose between the signal 702m coming from the first RF multiplexer 720 or the RF calibration (cal) tone 748 provided by the spectrum analysis subsystem 705. The output signal of "RF multiplexer M" 742 can go to one of the filters, Filter (M,1) 744a, . . . , Filter (M,N) 744n, where N is an integer. In some instances, the output signal of the filters can be amplified in the RF de-multiplexer 746. The amplified signal 708m can then be input into the spectrum analysis subsystem 705.

The spectrum analysis subsystem 705 can be configured to convert the detected RF signals into digital signals and perform digital signal processing to identify information based on the detected RF signals. The spectrum analysis subsystem 705 can include one or more SI radio receive (RX) paths (e.g., "SI radio RX path 1" 750a, "SI radio RX path M" 750m), a DSP spectrum analysis engine 760, an RF calibration (cal) tone generator 770, a front-end control module 780, and an I/O 790. The spectrum analysis subsystem 705 may include additional or different components and features.

In the example shown, the amplified signal 708 is input into "SI radio RX path 1" 750a, which down-converts the signal 708 into a baseband signal and applies gain. The down-converted signal can then be digitalized via an analog-to-digital converter. The digitized signal can be input into the DSP spectrum analysis engine 760. The DSP spectrum analysis engine 760 can, for example, identify packets and frames included in the digital signal, read preambles, headers, or other control information embedded in the digital signal (e.g., based on specifications of a wireless communication standard), determine the signal power and SNR of the signal at one or more frequencies or over a bandwidth, channel quality and capacity, traffic levels (e.g., data rate, retransmission rate, latency, packet drop rate, etc.), or other network-usage parameters. The output (e.g., the network-usage parameters) of the DSP spectrum analysis engine 760 can be applied and formatted to the I/O 790, for example, for transmission of the network-usage parameters to the data analysis system via one or more communication interfaces of the wireless sensor device.

The RF calibration (cal) tone generator 770 can generate RF calibration (cal) tones for diagnosing and calibration of the radio RX paths (e.g., "radio RX path 1" 750a, . . . "radio RX path M" 750m). The radio RX paths can be calibrated, for example, for linearity and bandwidth.

Figure 8:
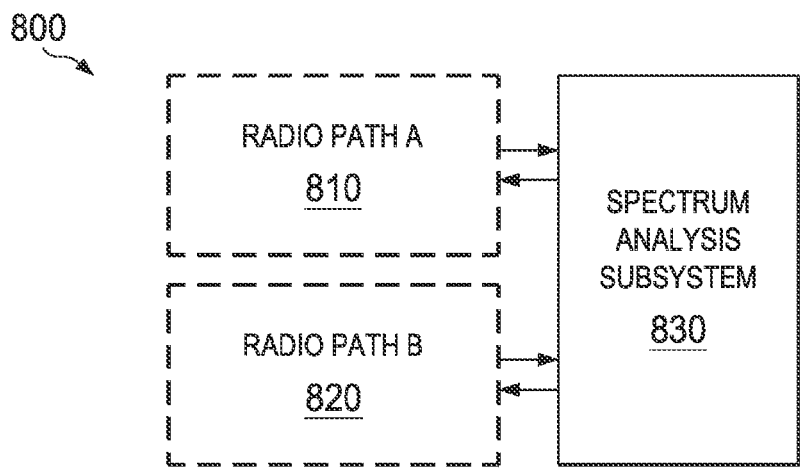
FIG. 8 is a block diagram showing another example SI signal path of a wireless sensor device.

FIG. 8 is a block diagram showing another example implementation of an SI signal path 800 of a wireless sensor device. In some instances, the SI signal path can include multiple RF interfaces (radio paths) that are connected to multiple different antennas. In the example shown in FIG. 8, the SI signal path 800 includes a radio path A 810 and a radio path B 820, each coupled to a spectrum analysis subsystem 830. The radio path A 810 and radio path B 820 can be configured in a similar manner as the RF interface or radio path A 710 of FIG. 7, or they can be configured in another manner. The radio path A 810 and radio path B 820 can have the same or different configuration, for example, covering the same or different frequency bands for wireless-spectrum monitoring and analysis.

Figure 9:
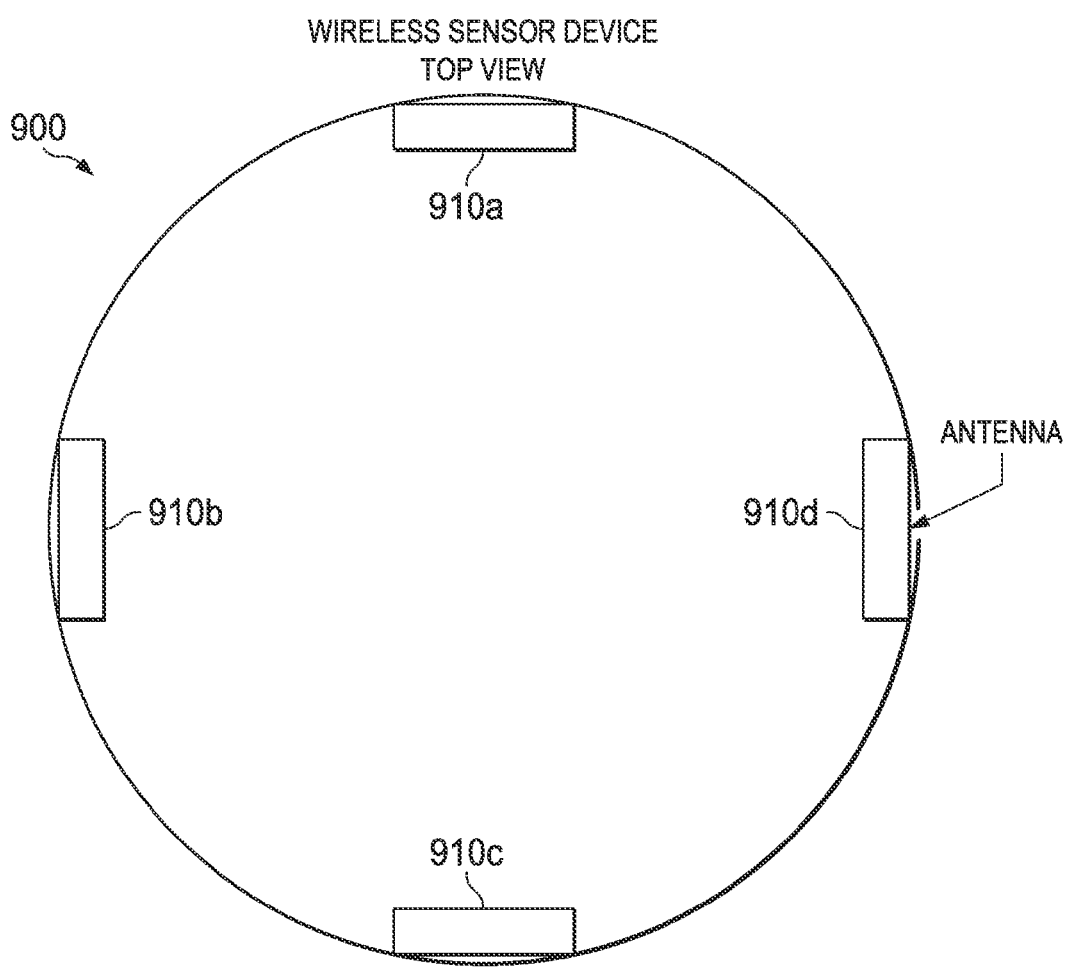
FIG. 9 is a top view of an example wireless sensor device.

FIG. 9 is a top view of an example wireless sensor device 900. In some cases, the wireless sensor devices of FIGS. 1-5 can be implemented as the example wireless sensor device 900 shown in FIG. 9 or as another type of wireless sensor device. The example wireless sensor device 900 in FIG. 9 can include some or all of the features shown in FIGS. 6-7, or the wireless sensor device 900 in FIG. 9 can include fewer, additional, or different features. The wireless sensor device 900 can include one or more antennas, for example, connected to one or more RF interfaces inside a housing of the wireless sensor device 900. For instance, the antennas of the example wireless sensor device 900 can be the antennas 622a-c of FIG. 6 or the antenna 722 of FIG. 7.

The antennas can be strategically arranged on the wireless sensor device 900 for reception of RF signals. The example wireless sensor device 900 shown in FIG. 9 includes four antennas 910a-d placed ninety degrees from each other relative to the center of the wireless sensor device 900. In some instances, the antennas can be arranged with a different degree of separation, orientation, or position, for example, based on the total number of antennas, the antenna profiles, the location and orientation of the wireless sensor device 900, or other factors.

Figure 10:
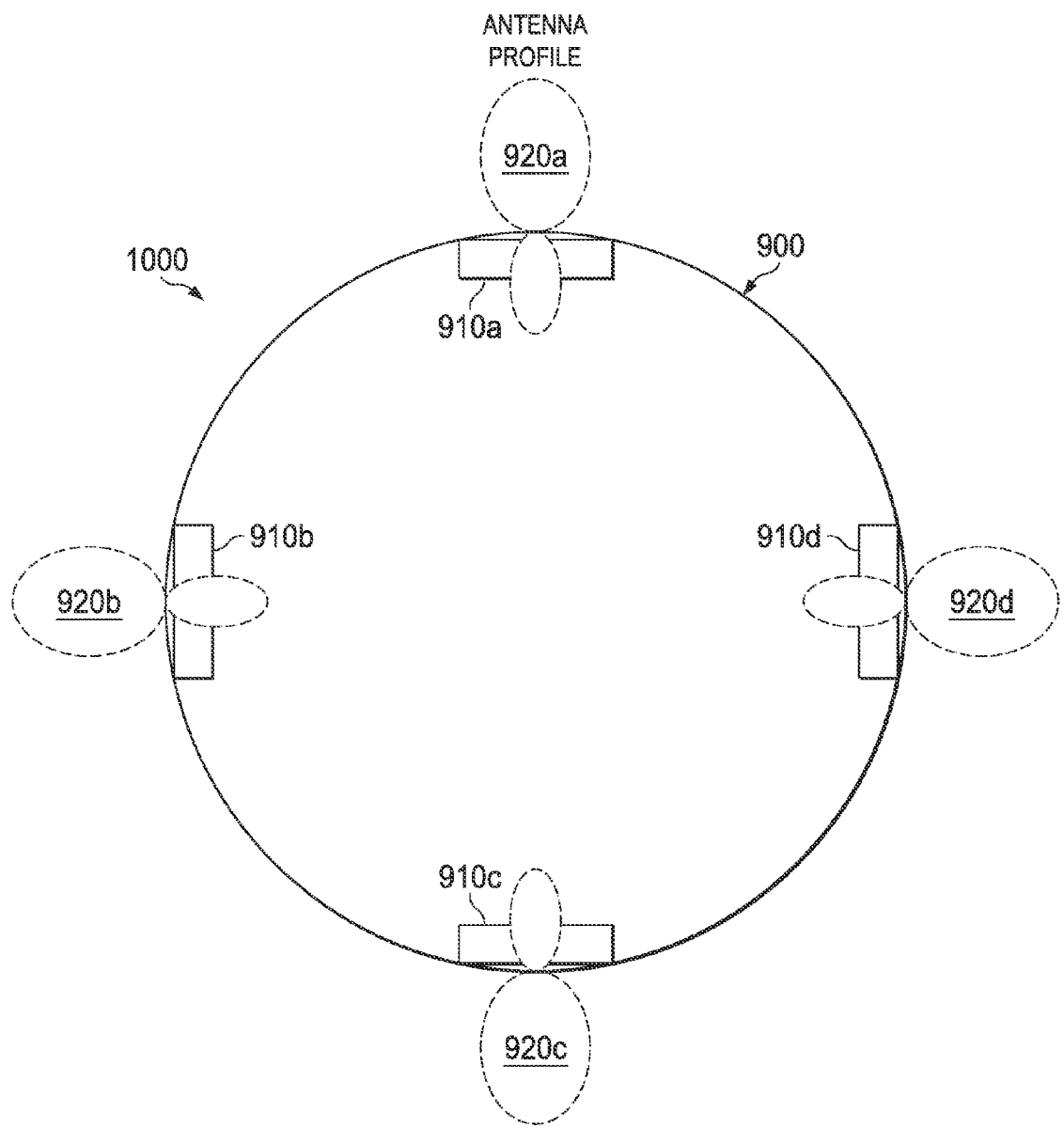
FIG. 10 is a top view of example antenna profiles of the antennas 910a-d of the example wireless sensor device 900 of FIG. 9.

FIG. 10 is a top view 1000 of example antenna profiles of the antennas 910a-d of the example wireless sensor device 900 of FIG. 9. In the example shown in FIG. 10, the antennas 910a-d have respective antenna profiles or patterns 920a-d, respectively. The antenna profiles 920a-d can be the same or different. The antenna profiles 920a-d can be selected or otherwise configured, for example, based on the frequency or frequency band of interest, the desired antenna gain, or other factors.

Figure 11:
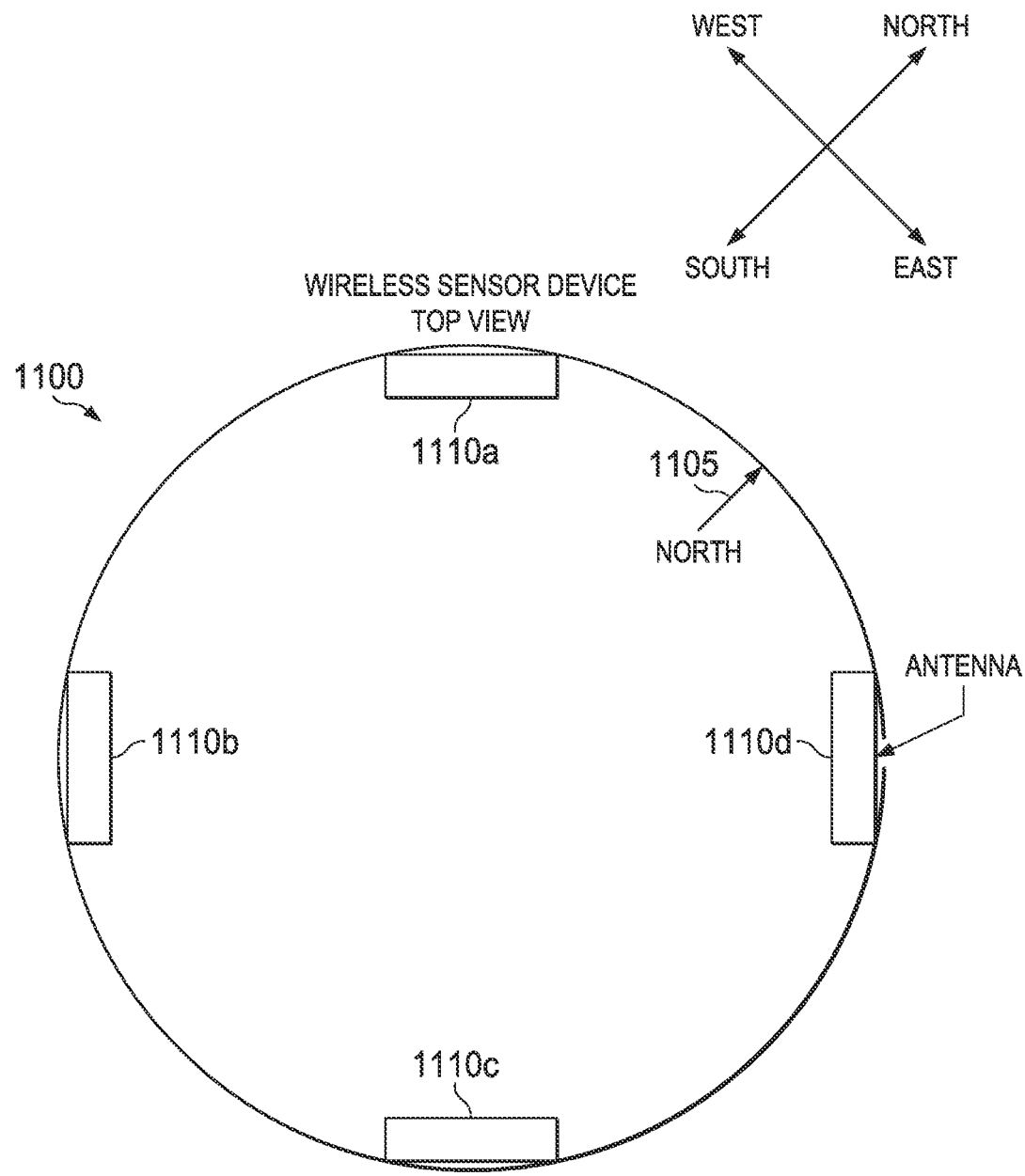
FIG. 11 is a top view of another example wireless sensor device.

FIG. 11 is a top view of another example wireless sensor device 1100. In some cases, the wireless sensor devices of FIGS. 1-5 can be implemented as the example wireless sensor device 1100 shown in FIG. 11 or as another type of wireless sensor device. The example wireless sensor device 1100 in FIG. 11 can include some or all of the features shown in FIGS. 6-10, or the wireless sensor device 1100 in FIG. 11 can include fewer, additional, or different features.

The wireless sensor device 1100 includes four antennas 1110*a-d* and a reference direction indicator 1105 on the wireless sensor device 1100. In some cases, the antennas 1110*a-d* are oriented or configured with respect to cardinal directions or another coordinate system according to the reference direction indicator 1105. In the example shown in FIG. 11, the reference direction indicator 1105 is oriented along the North compass direction. Another reference direction can be used. The orientations and displacements of the antennas 1110*a-d* can be identified and, in some cases, adjusted with respect to the reference direction indicator 1105.

In some implementations, a wireless sensor device can be a portable, modular device. For example, some wireless sensor devices can be moveable or reconfigurable for use in multiple locations (e.g., in series), without having to substantially deconstruct or disassemble the device. In some cases, wireless sensor devices are interchangeable with each other, so that the network of wireless sensor devices can be conveniently upgraded, expanded, tailored, or otherwise modified.

In some cases, a wireless sensor device can be installed by one or more operators, for example, by positioning the device and connecting it to standard power and data links. In some cases, a wireless sensor device can be secured in place by fasteners (e.g., screws, bolts, latches, adhesive, etc.), or a wireless sensor device can rest in a free position (e.g., without fasteners). In some instances, wireless sensor devices can operate in a variety of locations and environments. As an example, some wireless sensor devices can be installed in a vehicle (e.g., a car, a bus, a train, a ship, etc.) where the wireless sensor device can monitor and analyze the spectrum while in motion. In other examples, wireless sensor devices can be installed on traffic infrastructure, communication infrastructure, power infrastructure, dedicated real property, industrial systems, urban or commercial buildings, residential areas, and other types of locations.

Figure 12:
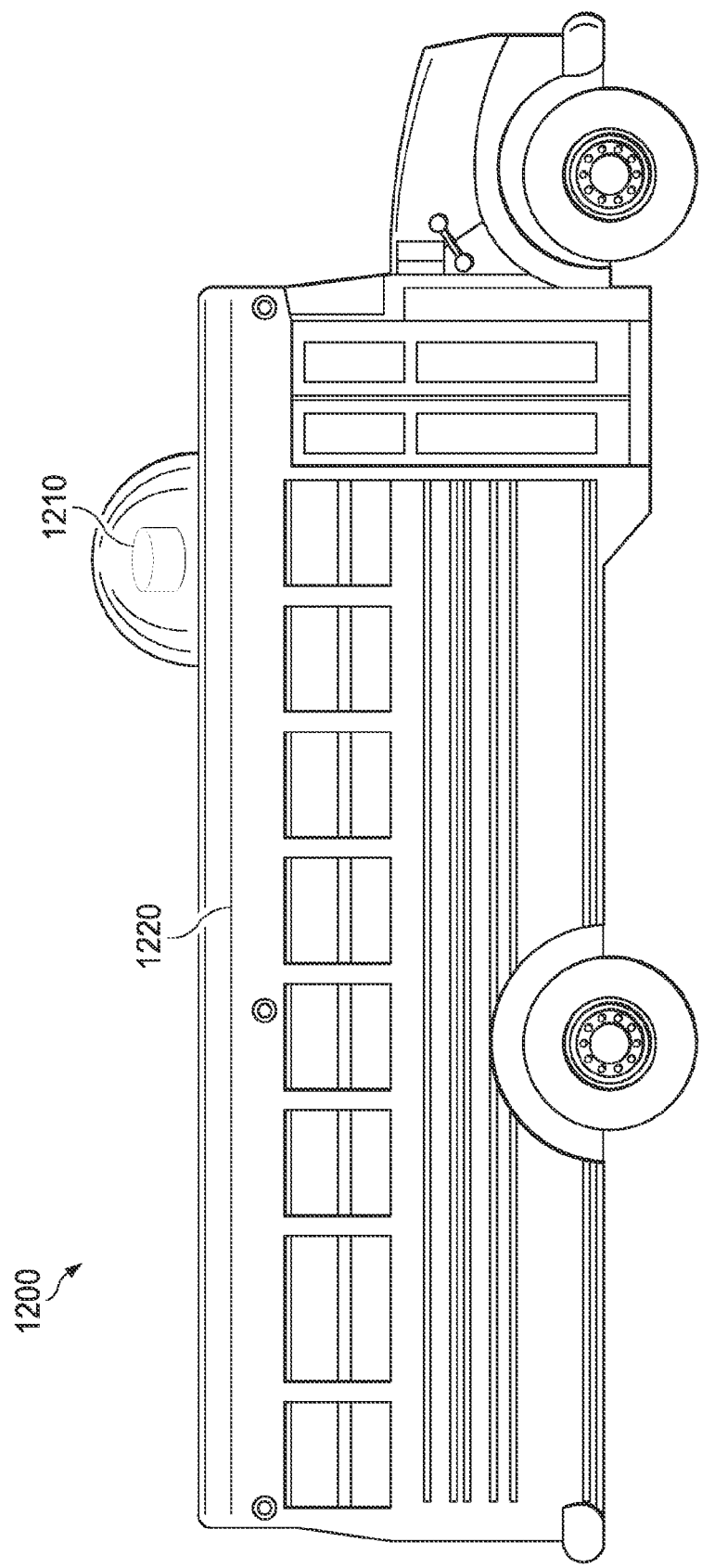
FIG. 12 is a block diagram showing an example application of a wireless sensor device.

FIG. 12 is a block diagram 1200 showing an example application of a wireless sensor device 1210, where the wireless sensor device 1210 is mounted on a bus 1220. The wireless sensor device 1210 can record its varying geographic locations, monitor wireless signals at each location, and transmit the spectrum inspection information to a central controller as the bus 1220 moves. In some implementations, the wireless sensor device 1210 can be configured to monitor and analyze the spectrum used by passengers on the bus 1220. For example, the wireless sensor device 1210 may detect identifiers of cellphones used by the passengers, detect cellular or WiFi signals transmitted and received by the cellphones of the passengers, and derive network-usage parameters specific to the RF traffic occurring within or around the bus 1220. The wireless sensor device 1210 can be configured in another manner. In some cases, the wireless sensor device 1210 can leverage power and communication capabilities of the bus 1220, or the wireless sensor device 1210 can include independent power and communications capabilities.

Figure 13:
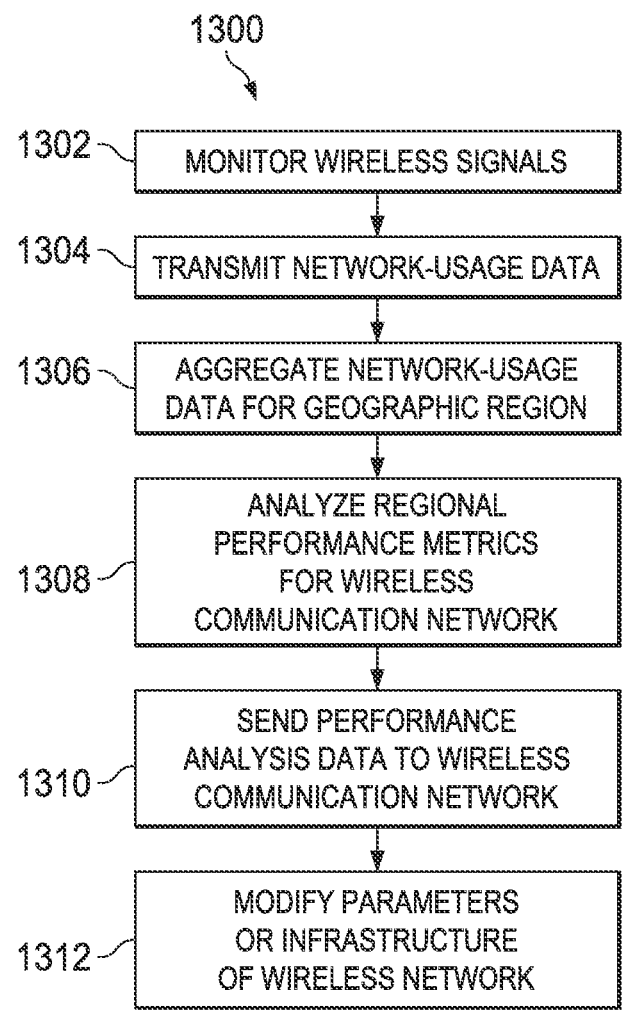
FIG. 13 is block flow chart showing an example technique for analyzing wireless network performance metrics.

FIG. 13 is a flowchart showing an example process 1300 for providing feedback to a wireless communication network. In some implementations, some or all of the operations in the example process 1300 shown in FIG. 13 can be performed by a wireless-spectrum analysis system, such as, for example, the wireless-spectrum analysis system 100 shown in FIG. 1 or another type of wireless-spectrum analysis system. In some implementations, some of the operations in the example process 1300 shown in FIG. 13 can be performed by a wireless network operator system, such as, for example, the wireless network operator system 250 shown in FIG. 2B or another type of wireless network operator system. The example process 1300 can include additional or different operations, and the operations can be performed in the order shown in FIG. 13 or in another order.

At 1302, wireless signals are monitored. The wireless signals can be monitored, for example, by a sensor network that includes wireless sensor devices distributed over a geographic region. The sensor network can include any of the example wireless sensor devices represented in FIG. 1, 2A, 3, 6, 7, 8, 9, 10, 11 or 12 or another type of wireless sensor device. In some cases, the wireless signals that are monitored are radio frequency (RF) signals exchanged in a wireless communication network. For example, the wireless signals can be RF signals exchanged between user equipment or a client device and a base station or a wireless router of the wireless communication network. The wireless signals can be monitored passively, for example, without sending data to or requesting services from the wireless communication network. In some examples, the wireless communication network is a cellular network (e.g., cellular voice, cellular data, or both), a Wi-Fi network, an ad hoc network, a pico-network, a Bluetooth network, or another type of wireless communication network. In some cases, each wireless sensor device is configured to monitor cellular network signals formatted according to any of multiple distinct cellular network standards (e.g., 3G, 4G, LTE, etc.).

In some implementations, the wireless sensor devices each compute local network-usage parameters by locally processing the signals detected by the individual wireless sensor device. For example, each wireless sensor device may include an RF interface, a signal analysis subsystem, and a communication interface. The RF interface of the wireless sensor device can detect RF signals in multiple bandwidths in the local wireless environment about the wireless sensor device. The signal analysis subsystem can generate the local network-usage parameters based on processing the RF signals detected in the local wireless environment. The communication interface can transmit processed data from the wireless sensor device, and the processed data can include the local network-usage parameters generated by the signal analysis subsystem. The local network-usage parameters can be processed in another manner in some cases.

At 1304, network-usage data are transmitted. For example, the network-usage data may include the parameters generated by individual wireless sensor devices, and the network-usage data can be transmitted from the wireless sensor devices to a data analysis system. The network-usage data can be transmitted over a wired or wireless connection, or a combination of multiple communication channels. At 1306, the network-usage data for a geographic region are aggregated. For example, a data analysis system can aggregate network usage data from multiple wireless sensor devices distributed over the geographic region. In some instances, the data analysis system aggregates network usage data from multiple geographic regions.

At 1308, regional performance metrics for the wireless communication network are analyzed. For example, the data analysis system that aggregates the network-usage data may analyze the data by comparing them against target performance values. The regional performance metrics may represent performance characteristics for a geographic region that contains many of the wireless sensor devices, and the analysis of the regional performance metrics may utilize local network-usage data from multiple distinct wireless sensor devices at disparate locations in the geographic region.

The regional performance metrics can include, for example, technical specifications or criteria for operation of the wireless communication network. In a wireless communication network where data are communicated wirelessly (e.g., in a cellular data network, and a Wi-Fi network, etc.), the regional performance metrics may include a minimum or target data transmission rate or another type of metric. The minimum or target data transmission rate can be specified, for example, in megabits per second or similar units.

In a wireless communication network where voice calls are communicated wirelessly (e.g. in a cellular voice network, etc.), the regional performance metrics may include the statistics of potentially dropping a call. For example, the regional performance metrics may specify a maximum percentage of dropped calls that will be tolerated in a certain region, over a certain time, etc. A dropped call occurs, for example, when a voice call is terminated due to an error or action in the wireless communication network, as opposed to being terminated by a user. Dropped calls may be caused by wireless interference, insufficient wireless power, inadequate cell coverage, or other technical errors in the wireless communication network. In some instances, dropped calls are statistically determined by analyzing the signal to noise ratio (SNR) of the wireless signals. For example, in some wireless networks, the probability of dropping a call increases when the SNR drops below some threshold value; this can be statistically calculated. The SNR may include or account for all impairments such as, for example, interference, low power levels, and high sources of noises.

At 1310, performance data are sent to the wireless communication network. The wireless communication network can receive the performance data, for example, as real-time or post-time feedback on the actual performance of the wireless communication network. For example, the data analysis system that analyzes the regional performance metrics can include a reporting interface that transmits a network performance report to the wireless communication network. The performance report can include information identified from analyzing the regional performance metric or other information based on the local network-usage parameters computed by the wireless sensor devices. The performance report may be sent upon detecting a problem or a correction to be made, at predetermined intervals, or a combination of these and other times.

At 1312, operational parameters or infrastructure of the wireless communication network are modified. For example the value of an operating parameter may be increased or decreased, the setting or configuration of equipment may be changed, or other types of modifications can be made. In some cases, the modifications are based on specific performance deficiencies identified in the performance report. For example, if a geographic region has a high number of dropped calls or low data speeds, the power output can be increased to that geographic region, or a more robust modulation scheme or error correcting scheme can be used. As another example, if interference is detected in a geographic region, a different operating frequency, channel or band can be used in that region.

In some implementations, analyzing the regional performance metric (at 1308) includes computing an observed value of the regional performance metric based on the local spectral-usage parameters computed by the wireless sensor devices distributed over the geographic region. The observed value may be compared against a target value for the regional performance metric, and the performance data may be sent (at 1310) in response to the comparison. For example, if the observed value is above a threshold, below a threshold or outside a target range for a regional performance metric, the performance report may be sent automatically. In some implementations, the observed value is sent to the wireless communication network (at 1310), and the wireless communication network compares the observed value against the target value, and may take action based on the comparison. For example, the wireless communication network may include a control system that analyzes the observed value of the regional performance metric and generates a command to network infrastructure equipment, where the command is configured to improve performance of the wireless communication network. In some cases, the performance report includes the commands to network infrastructure equipment, and the wireless communication network delivers the commands to appropriate infrastructure equipment. The command can be executed to modify the operating parameters or network infrastructure equipment at 1312.

In some implementations, the performance report indicates a location in the geographic region where observed performance of the wireless communication network does not meet a performance criterion specified by the wireless communication network. For example, the data analysis system that analyzes the regional performance metric may detect network performance that is below target performance metrics set by the wireless communication network. In some cases, the data analysis system can also identify a location within the geographic region where the performance is below target. The wireless communication network operator system can use the performance report to detect or identify corrective actions based on the location information included in the performance report.

In some implementations, modifying operating parameters or network infrastructure equipment (at 1312) includes modifying (increasing or decreasing) an operating frequency for wireless communication in a geographic region, modifying an operating channel or frequency band for wireless communication and geographic region, or otherwise modifying a wireless communication mode between the network and the user equipment. In some implementations, modifying operating parameters or network infrastructure equipment (at 1312) includes modifying a transmit power characteristic of the wireless communication network. Examples of modifying a transmit power characteristic include modifying a transmit power control dynamic, modifying (increasing or decreasing) a transmit power level, moving an antenna on a base station, or modifying other parameters.

In some implementations, modifying operating parameters or network infrastructure equipment (at 1312) includes changing a radiation pattern of one or more base station antennas. For example, the base station antenna may be a directional antenna that can be rotated or otherwise reconfigured to provide better coverage for a specific geographic region. As another example, the base station antenna may be reconfigured to cover a broader or narrower portion of the geographic region. In some implementations, modifying operating parameters or network infrastructure equipment (1312) includes changing a physical configuration of the sector. For example, the size and extent of a cell in a cellular network can be modified (increased or decreased) to avoid interference with other cells or phenomena detected in the geographic region. In some cases, modifying operating parameters or network infrastructure equipment (1312) includes changing a maximum output power of the base station transmitter. For example, the maximum output power may be increased or decreased to save power when possible or to provide better coverage when needed.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other embodiments are within the scope of the following claims.

The invention claimed is:

1. A wireless monitoring system comprising:
   a sensor network comprising wireless sensor devices distributed over a geographic region, the sensor network configured to passively monitor radio frequency (RF) signals exchanged in a wireless communication network in the geographic region, each wireless sensor device configured to compute local network-usage parameters based on processing the RF signals detected by the wireless sensor device, the wireless sensor devices operating independent of wireless communication network devices;
   a data analysis system configured to:
      receive, from each wireless sensor device of the sensor network, the local network-usage parameters associated with the wireless sensor device, a temperature of the wireless sensor device, a current power consumption of the wireless sensor device, and wireless signal information associated with the wireless sensor device, the wireless signal information comprising an identifier, an address, or a signal strength of the RF signals detected by the wireless sensor device; and
      analyze a regional performance metric of the wireless communication network based on the local network-usage parameters computed by the wireless sensor devices distributed over the geographic region; and
   a reporting interface configured to transmit a network performance report to the wireless communication network based on the analysis of the regional performance metric.

2. The system of claim 1, wherein analyzing the regional performance metric comprises computing, based on the local network-usage parameters, an observed value of the regional performance metric.

3. The system of claim 2, wherein analyzing the regional performance metric comprises comparing the observed value with a target value for the regional performance metric, and the network performance report is transmitted in response to a result of the comparison.

4. The system of claim 2, wherein the network performance report comprises the observed value of the regional performance metric, and an operator system associated with the wireless communication network comprises:
   a feedback interface configured to receive the network performance report; and
   a control system configured to:
      analyze the observed value of the regional performance metric; and
      generate a command to infrastructure equipment of the wireless communication network, the command being configured to improve performance of the wireless communication network.

5. The system of claim 1, wherein the network performance report indicates:
   a location in the geographic region where observed performance of the wireless communication network does not meet a performance criterion specified by the wireless communication network; and
   a description of the observed performance based on the local network-usage parameters.

6. The system of claim 1, wherein the network performance report includes a command to infrastructure equipment of the wireless communication network, the reporting interface is configured to generate the command based on the analysis of the regional performance metric, and the command is configured to improve performance of the wireless communication network.

7. The system of claim 1, wherein the network performance report identifies modifications of the wireless communication network to improve performance of the wireless communication network, the modifications comprising at least one of:
   modifying an operating frequency, channel, or band of the wireless communication network;
   modifying a transmit power characteristic of the wireless communication network; or
   modifying a modulation scheme, error correction, or spreading factor of the wireless communication network.

8. The system of claim 1, wherein the network performance report identifies modifications of the wireless communication network to improve performance of the wireless communication network, the modifications comprising at least one of:
   changing a radiation pattern of a base-station antenna;
   changing a physical configuration of a sector; or
   changing a maximum output power of a base-station transmitter.

9. The system of claim 1, wherein the wireless communication network comprises a cellular network, and the wireless sensor devices are configured to passively monitor cellular network signals formatted according to any of multiple distinct cellular network standards.

10. The system of claim 1, wherein passively monitoring RF signals exchanged in a wireless communication network comprises receiving the RF signals without sending signals to or requesting services from the wireless communication network.

11. The system of claim 1, wherein each wireless sensor device comprises:
   a radio-frequency (RF) interface configured to detect, in a local wireless environment about the wireless sensor device, RF signals in multiple distinct bandwidths of an RF spectrum;
   a signal analysis subsystem configured to generate the local network-usage parameters based on processing the RF signals; and
   a communication interface configured to transmit processed data from the wireless sensor device, the processed data comprising the local network-usage parameters generated by the signal analysis subsystem.

12. The system of claim 1, wherein the wireless communication network comprises a cellular network, and analyzing the regional performance metric comprises analyzing dropped calls in the cellular network for the geographic region.

13. The system of claim 1, wherein the wireless communication network comprises a cellular network, and analyzing the regional performance metric comprises analyzing data transmission rates in the cellular network for the geographic region.

14. A method comprising:
receiving, at a data analysis system, local network-usage parameters provided by a sensor network that passively monitors radio frequency (RF) signals exchanged in a wireless communication network in a geographic region, the sensor network comprising wireless sensor devices distributed over the geographic region, each wireless sensor device configured to compute local network-usage parameters based on processing the RF signals detected by the wireless sensor device, the wireless sensor devices operating independent of wireless communication network devices;
receiving, at the data analysis system from each wireless sensor device of the sensor network, a temperature of the wireless sensor device, a current power consumption of the wireless sensor device, and wireless signal information associated with the wireless sensor device, the wireless signal information comprising an identifier, an address, or a signal strength of the RF signals detected by the wireless sensor device;
analyzing, by operation of the data analysis system, a regional performance metric of the wireless communication network based on the local network-usage parameters computed by the wireless sensor devices distributed over the geographic region; and
transmitting, to the wireless communication network, a network performance report based on the analysis of the regional performance metric.

15. The method of claim 14, further comprising:
monitoring wireless-spectrum usage concurrently at the wireless-spectrum monitoring locations by operation of the wireless sensor devices;
transmitting, from each wireless sensor device, the local network-usage parameters identified by the wireless sensor devices; and
aggregating the local network-usage parameters transmitted from the wireless sensor devices.

16. The method of claim 14, wherein analyzing the regional performance metric comprises computing, based on the local network-usage parameters, an observed value of the regional performance metric, analyzing the regional performance metric comprises comparing the observed value with a target value for the regional performance metric, and the network performance report is transmitted in response to a result of the comparison.

17. The method of claim 14, wherein analyzing the regional performance metric comprises computing, based on the local network-usage parameters, an observed value of the regional performance metric, the network performance report comprises the observed value of the regional performance metric, and the method further comprises:
receiving the network performance report at an operator system associated with the wireless communication network; and
generating, by operation of the operator system, a command to infrastructure equipment of the wireless communication network based on analysis of the observed value of the regional performance metric, the command being configured to improve performance of the wireless communication network.

18. The method of claim 14, wherein the network performance report indicates:
a location in the geographic region where observed performance of the wireless communication network does not meet a performance criterion specified by the wireless communication network; and
a description of the observed performance based on the local network-usage parameters.

19. The method of claim 14, wherein the network performance report includes a command to infrastructure equipment of the wireless communication network, and the command is generated based on the analysis of the regional performance metric and configured to improve performance of the wireless communication network.

20. The method of claim 14, wherein the network performance report identifies modifications of the wireless communication network to improve performance of the wireless communication network.

21. The method of claim 14, wherein the wireless communication network comprises a cellular network, and the wireless sensor devices are configured to passively monitor cellular network signals formatted according to any of multiple distinct cellular network standards.

22. A wireless monitoring system comprising:
means for generating local network-usage parameters for distinct locations distributed over a geographic region based on radio frequency (RF) signals exchanged in a wireless communication network in the geographic region, said means operating independent of wireless communication network devices;
a computing system configured to perform operations comprising:
receiving, from said means, the local network-usage parameters, a temperature of said means, a current power consumption of said means, and wireless signal information associated with said means, the wireless signal information comprising an identifier, an address, or a signal strength of the RF signals;
analyzing a regional performance metric of the wireless communication network based on the local network-usage parameters; and
transmitting a network performance report to the wireless communication network based on the analysis of the regional performance metric.

23. The system of claim 22, wherein the computing system comprises a data-processing apparatus configured to analyze the regional performance metric, and a communication interface configured to transmit the network performance report.

24. The system of claim 22, wherein analyzing the regional performance metric comprises computing, based on the local network-usage parameters, an observed value of the regional performance metric, analyzing the regional performance metric comprises comparing the observed value with a target value for the regional performance metric, and the network performance report is transmitted in response to a result of the comparison.

25. The system of claim 22, wherein analyzing the regional performance metric comprises computing, based on the local network-usage parameters, an observed value of the regional performance metric, the network performance report comprises the observed value of the regional performance metric, and an operator system associated with the wireless communication network comprises a second computing system configured to:
receive the network performance report;
analyze the observed value of the regional performance metric; and generate a command to infrastructure equipment of the wireless communication network, the command being configured to improve performance of the wireless communication network.

26. The system of claim 22, wherein the network performance report includes a command to infrastructure equipment of the wireless communication network, and the command is configured to improve performance of the wireless communication network.

* * * * *